United States Patent [19]
Campbell, Jr. et al.

[11] Patent Number: 5,172,326
[45] Date of Patent: Dec. 15, 1992

[54] PATTERNED WEB CUTTING METHOD AND SYSTEM FOR OPERATION MANIPULATION OF DISPLAYED NESTED TEMPLATES RELATIVE TO A DISPLAYED IMAGE OF A PATTERNED WEB

[75] Inventors: Robert L. Campbell, Jr., Hickory; Harry S. Hickman, II, Morganton; Thomas E. Holshouser, Granite Falls; Gary L. Icenhour, Taylorsville, all of N.C.

[73] Assignee: FORCAM, Incorporated, Hickory, N.C.

[21] Appl. No.: 495,716

[22] Filed: Mar. 19, 1990

[51] Int. Cl.$^5$ .............................................. G06F 15/46
[52] U.S. Cl. .............................. 364/470; 364/474.08; 364/494.09
[58] Field of Search ............... 364/468, 469, 470, 471, 364/473, 474.22, 474.08, 474.09, 474.25; 198/817, 840, 845; 382/8, 48, 61; 83/76.7, 734; 219/121.67–121.72, 121.82

[56] References Cited

U.S. PATENT DOCUMENTS

| | | | |
|---|---|---|---|
| 3,769,488 | 10/1973 | Hasslinger | 364/470 |
| 4,140,037 | 2/1979 | Gerber . | |
| 4,315,437 | 2/1982 | Etcheparre et al. . | |
| 4,370,932 | 2/1983 | Etcheparre et al. . | |
| 4,583,181 | 4/1986 | Gerber et al. | 364/470 |
| 4,645,900 | 2/1987 | Heyden | 219/121.67 |
| 4,672,172 | 6/1987 | Pearl | 219/121.67 |
| 4,758,960 | 7/1988 | Jung | 364/470 |
| 4,794,678 | 1/1989 | Reim et al. . | |
| 4,853,866 | 8/1989 | Galan et al. | 364/470 |
| 4,901,359 | 2/1990 | Bruder | 382/61 |
| 4,918,611 | 4/1990 | Shyu et al. | 219/121.67 |
| 4,961,149 | 10/1990 | Schneider et al. | 364/469 |

OTHER PUBLICATIONS

"Waterjet Cutting Systems", Ingersoll-Rand, Form 14001.
"Ashworth Belts", Ashworth Bros., Inc., General 11-87.
"TI-24A High Resolution CCD Monochrome Camera", NEC America, Inc., TI240388JW.
"3000A Economical Printer", INTERMEC Product Catalog, Addendum No. 4, INTERMEC Corporation, Addendum 605352 Rev. T Aug. 31, 1989.
"Robotic Label Applicator", IMTEC 3600 Series, Imtec, Inc. 03A4286.
"Advanced Motion Controller" DMC/600, Galil Motion Control, Inc., Rev.(7-88).
"Lectra Cutter", E 95.3 Automated Cutting System, Lectra Systems, Inc., Aug. 1988.

Primary Examiner—Jerry Smith
Assistant Examiner—Jim Trammell
Attorney, Agent, or Firm—Bell, Seltzer, Park & Gibson

[57] ABSTRACT

A method and system for cutting a web, such as a patterned fabric, displays a nested template pattern for the fabric along with a superimposed image of the fabric on a display screen, to allow the nested template pattern to be moved relative to the fabric image, under operator control. The nested template pattern may be moved as a whole, and individual templates may be moved, rotated or warped, so that a new template pattern is produced which is aligned to the fabric image, notwithstanding defects such as skew, bow or uneven repeat in the fabric. Once produced, the new template pattern is converted into customized cutting instructions for the fabric. The customized instructions are used to control a cutting station, for example a laser cutting station, to cut each section of fabric according to its customized cutting instructions.

High speed cutting of patterned fabric may be provided by simultaneously capturing the image of a first section of fabric, generating a customized template pattern for a second section of fabric, the image of which has already been captured, and cutting a third section of fabric, the customized cutting instructions for which have already been generated.

106 Claims, 28 Drawing Sheets

PATTERNED WEB CUTTING METHOD AND SYSTEM FOR OPERATION MANIPULATION OF DISPLAYED NESTED TEMPLATES RELATIVE TO A DISPLAYED IMAGE OF A PATTERNED WEB

FIELD OF THE INVENTION

This invention relates to web cutting, and more particularly to a method and system for cutting a web, such as a patterned fabric web, according to predefined template patterns.

BACKGROUND OF THE INVENTION

Upholstered furniture is generally covered with leather, vinyl, and fabric. A significant part of the manufacturing cost of furniture is the cost of cutting the cover. Most inexpensive furniture is covered with vinyl or plain fabric or fabric with a small overall pattern. When plain fabric or fabric with a small overall pattern or vinyl is used, it can be cut by placing one layer on top of another, building a stack that is then cut at one time. For this kind of production, automatic machines are known that can stack the fabric or vinyl and then, using a computer guided knife or any suitable cutting means, cut the stack into the required pattern pieces.

More expensive furniture uses fabric that must be matched when applied. The most complicated matching is required with floral patterns. Examples of matching are (1) a stripe that starts at the lower back of a sofa and continues up the back, over the top, down the seat back, across the seat, and down the front to the bottom; (2) each cushion has a flower centered thereon; or (3) trees or animals that are larger than a single piece of fabric in the furniture and which appear to flow across two or more pieces.

Matched fabric is typically manufactured by weaving, knitting, or printing. Unfortunately, as fabric is manufactured, it must pass over many rollers. As a result of the manufacturing process, fabric typically has skew (i.e., the filler or yarn going from one edge to the other across the web is not perpendicular to the length of the fabric) or bow (i.e., the filler yarn is not straight) or both. Moreover, the fabric is typically printed with a printing cylinder or by screen printing. With either method the repeat of the pattern is not consistent. Even if the repeat was originally perfect, the fabric stretches as it is processed. Accordingly, the manufactured fabric typically differs considerably from the ideal in terms of skew, bow and repeat. The fabric may also have other defects including but not limited to dropped threads, holes, and printing defects. Because of these many defects, matched fabric cannot be stacked with any reliability of pattern match and therefore must be cut one layer at time.

The most common method for cutting matched fabric is as follows: The matched fabric is first spread on a cutting table. A highly trained operator places (nests) the individual templates of the pattern on the fabric in the appropriate places so that after cutting, sewing, and upholstering the furniture, the pattern on the furniture matches. After all of the individual templates of the pattern are in their proper place, the operator marks with chalk around each template. The pattern templates are then removed and the fabric is cut with a rotary knife or scissors. An extension of the above described cutting method furnishes the operator with a miniature layout diagram of the total pattern for a perfect fabric as a guide to a more efficient nest, i.e. the nest which requires the least amount of fabric. This layout diagram is referred to as an initial nest.

One method of producing these miniature layout diagrams (initial nest) is as follows: Each fabric is first categorized into 15 to 20 general types. Examples are: regular (the stripe or pattern runs down the length of the fabric), railroad (the stripe or pattern runs across the width of the fabric), railroad center design (the pattern has its top pointing across the fabric and there is one pattern in the center of the web), railroad side by side (the pattern has its top pointing across the web and there are two pattern repeats across the web) and regular three repeat (the top of the pattern is pointing down the length of the web and there are three repeats down the web). After this initial sorting, each repeat distance is then added within each initial category. There are many combinations using this or other similar methods but the specific pattern (flowers, birds, prints etc.) does not have to be considered. Next, miniatures of each template in a cutting pattern are drawn to scale. These miniatures are then arranged in an appropriate layout and a photograph is taken.

Computer programs to assist an operator with producing the initial nest have become available in the past few years, for example the marking system marketed by Micro Dynamics, Dallas, TX. Each full size pattern template for each specific furniture style is entered into the computer using a digitizing tablet, optical scanner, computer automated design (CAD) drawings, or other appropriate means. A group of lines, both horizontal and vertical, that represent the fabric pattern, along with scale miniatures of each piece of fabric to be cut, are displayed on the computer display. The miniatures are displayed in a random pattern outside the area of the display representing the fabric pattern. The operator, using a pointing device or other input device such as a keyboard, picks the first pattern template and places it on the grid lines representing the fabric. The computer program assists the operator in placing the pattern templates on the grid by forcing the match point of the pattern template to the intersection of the grid lines. After all of the miniatures are placed in their appropriate place, a permanent record is made and a hard copy of the layout is produced. The outline of each pattern template along with its appropriate placement, in digital form, may also be used to generate cut data for a computer guided cutting machine.

Most computer guided fabric cutting machines include a brush table. The brush table comprises brush bristles standing on end pointing upward. A motor driven reciprocating knife is carried above this table by a gantry. This gantry has both x (longitudinal) and y (across the web) axes. These axes are generally driven by servo motors interfaced to a computer numerical controller. After one or more layers of fabric is stacked on the brush table, a layer of plastic film is applied to the top of the stack. A vacuum is applied to the underside of the plastic film through the brush table to compact and hold the fabric stack while the knife reciprocates up and down through the fabric stack and into the brush table. The simpler machines have a stationary brush table. More expensive machines utilize a conveyorized brush table and include a conveyor section to stack the fabric while the knife is cutting a previous template. Some machines include an off-load section of conveyor table so that cut pieces can be removed while the knife is still cutting. All conveyorized machines index in sections equal to the length of the actual cutting area.

If the fabric to be cut is plain, the above described machines may be used. If matched fabric was perfect, this type of machine could also be used, because the pattern layout generated by the computer aided marking system would perfectly fit each piece of fabric being cut. However, since matched fabric typically contains the imperfections described above, these machines cannot be used.

One method to enable the above mentioned cutting machines to cut matched fabric is as follows: The total pattern for a given style of furniture is studied. Each major individual piece of the pattern (for example, the seat bottom and back) is placed on a fabric pattern representation and then its most closely related small fabric pattern templates are nested around each major template. In theory, since the pattern repeat is only off by a small amount in any small area, each major piece and its most closely related smaller pieces will match to a fairly acceptable degree.

After this nesting is complete, it is used to guide the cutting machine. The cutting machine instructions include a move by the cutting knife, to the center of the fabric pattern for each major nested group. After this move to the center of the group, a stop instruction is inserted to cause the cutting machine to stop. Once stopped, the machine operator can visually check to see if the stopped cutting machine is in fact at the center of the fabric pattern. If not, then the machine operator can move the cutting machine, using a joy stick or jog buttons, so that the center of the pattern nest coincides with the center of the pattern. This manual move of the machine may be used by the computer when the next nested group of pattern templates is cut. A system which implements the above described method is commercially available as the Model E95.3 marketed by Lectra Systems, Marietta, Ga.

Unfortunately, the above described method and system can only cut fabric accurately if the only fabric defects are pattern repeat errors; i.e. the repeat distance varies. This method cannot correct for other types of fabric defects such as bow, skew, dropped threads, holes or printing defects.

Some newer equipment such as the Model E95.3 with Video Option marketed by Lectra Systems, Marietta, Ga., also mounts a video camera on the cutting gantry. The live video signal is mixed with a digital image of the template of the pattern to be cut in this area of the fabric and displayed, on a computer screen. An "X" is placed at the cutting knife's location. This aid helps the machine operator see the fabric better and move the cutting machine so that the center of the pattern nest coincides with the center of the pattern. However, this live camera only permits the operator to see the fabric at the cutting knife's location so that direct visual observation at the cutting knife is not necessary.

SUMMARY OF THE INVENTION

It is therefore an object of the present invention to provide an improved web cutting method and system.

It is another object of the present invention to provide an improved matched fabric cutting method and system.

It is yet another object of the invention to provide accurate cutting of matched fabric notwithstanding skew, bow, stretch or other deviations from perfection in the fabric.

It is still another object of the invention to provide accurate pattern matching notwithstanding holes, dropped threads, printing errors or other defects in the fabric.

It is still a further object of the invention to provide a fabric patterning process which does not require manual jogging or adjustment of the cutting tool.

These and other objects are provided according to the present invention, by a fabric, leather or other web cutting system and method in which the nested templates in a stored template pattern are displayed on a computer display screen superimposed upon an image of the actual section of the fabric to be cut, and wherein the templates in the pattern may be moved relative to the displayed image of the fabric to align the displayed templates to the fabric. Preferably the templates in the pattern may be individually moved relative to one another and relative to the displayed image of the fabric to individually align the displayed templates to the fabric. A new template pattern for the displayed section of the fabric is thereby produced. The template pattern is converted into new cutting instructions for that section of the fabric, which are used to cut that section of the fabric. Accordingly, each section of the fabric is cut based upon a template pattern, the templates of which may be individually aligned to the section of fabric.

More particularly, the image fabric cutting system of the present invention includes an image capture means for capturing the image of the fabric. In one embodiment, the image capture means is a movable camera which is directed to move ("pan") based on operator instructions as various sections of the fabric are scanned. The camera may be also directed to magnify or reduce the image in accordance with operator instructions. In a second embodiment, a camera, preferably a stationary camera, is used to capture the image of a predetermined section of the fabric, digitize this image and store this image in a mass storage device, such as video memory or random access memory (RAM). Then, movement of the image of the fabric on a display screen may occur by manipulating the digital image of the fabric rather than having to physically move the camera. Rapid magnification, reduction and panning of the image is thereby obtained.

The image capture station of the present invention is preferably controlled by a computer controller which may be in the form of a computer workstation. The controller stores a library of template patterns, each of which comprises a number of nested templates for a particular item of furniture. The proper template pattern for the fabric to be nested is obtained and displayed on a display screen. Superimposed on the template pattern is the image of the fabric. The operator effects movement of the displayed nested templates relative to one another and relative to the displayed image of the fabric in order to individually align the displayed templates to the displayed image of the fabric. In performing this individual alignment, the operator may pan from one section of the fabric to another and may zoom (magnify or reduce) a section of the fabric. When panning or zooming, the image of the fabric moves along with the superimposed template images. When the image capture station comprises a movable camera, zooming or panning takes place by moving the camera or camera lens. When the image capture station comprises a stationary camera, zooming and panning takes place by manipulating the stored digital image.

The fabric cutting system of the present invention provides flexible on-screen manipulation of the nested templates for the fabric. In particular, an individual template may be translated relative to the remaining templates and the fabric image to provide fabric match. An individual template may also be rotated relative to the other templates and the fabric. An individual template may also be skewed or bowed to take into account nonlinear variations in the fabric. Accordingly, each template may be individually nested to provide optimal alignment with the actual fabric, notwithstanding skew, bow, repeat errors, dropped threads, holes or other imperfections and defects.

Once the templates in the pattern have been nested relative to the fabric, the nested templates are converted into cutting instructions for a cutting station. The cutting station is then controlled using these cutting instructions, either directly, or via a well known Computer Numerical Control (CNC) device. Accordingly, when the nested section of fabric reaches the cutting station, the cutter need not be jogged or manually manipulated, because the cutting instructions have already been customized for that particular section of the fabric to be cut.

The fabric cutting station of the present invention may comprise a conventional reciprocating knife fabric cutting station. Alternatively, a laser or water jet fabric cutting station may be used. The cutting station may also include a label maker for placing identifying indicia directly upon the fabric when it is cut. A chalker may also be included to provide guiding marks for later processing. When a laser or water jet cutting station is used, a "flat wire" conveyor is preferably used to convey the fabric from the image capture station to the cutting station. The flat wire conveyor includes nested serpentine flat wires which are maintained face to face in a nested, serpentine relationship using rods which pass through holes in the faces of the flat wires. The flat wire conveyor exposes a minimum amount of the conveyor to the laser so that the laser can cut the fabric without burning the conveyor, or reflecting the laser energy back to the fabric. With a water jet, splash-back is minimized. The spaces between the flat wires also allow for smoke and water exhaust.

The fabric cutting station of the present invention preferably comprises a movable fabric cutting station such as a movable laser beam or water jet. According to the invention, the movable station may move and cut the fabric while the conveyor is moving. Continuous cutting on the moving conveyor is thereby provided.

It will be understood by those having skill in the art that a continuous conveyor need not be used. Transfer tables may be used to transfer individual fabric sections from one station to another. It will also be understood by those having skill in the art that the stations of the present system may be located adjacent one another for high speed operation. However, the stations may also be physically separated from one another, with the computer controller communicating with the stations over a local area network if necessary. Any known transfer means may be used to transfer the fabric from one station to another.

The fabric cutting method of the present invention provides capturing an image of a first section of the fabric while simultaneously allowing nesting of a second section of the fabric, using the stored templates and a displayed, previously captured, fabric image of the second section. Moreover, a third section of fabric may be simultaneously cut according to previously generated customized instructions for the third section of fabric. In other words, after the image of the first section is captured and the first section has been nested based on manipulation of the displayed templates and captured fabric image, the nested templates are stored and the first section of the fabric is conveyed to the cutting station. While the first section of fabric is conveyed to the cutting station, the cutting instructions for the first section of fabric may be produced based on the nested templates for the first section of the fabric. At the same time, a second section of the fabric is nested based on the stored templates and the image of the second section of the fabric. Accordingly, the image capture station may be used to capture images of sequential sections of the fabric. The workstation display may be used to nest sequential sections of the fabric and the laser cutter may be used to cut the already nested sequential sections of the fabric, so that each station is used simultaneously and continually. Simultaneous operations provide high speed nesting and cutting.

BRIEF DESCRIPTION OF THE DRAWINGS

FIGS. 8a–8e illustrates the detailed operational flow of the Cut Queue according to the present invention.

DETAILED DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview: Fabric Cutting With Movable Image Capture Camera

Figure 1:
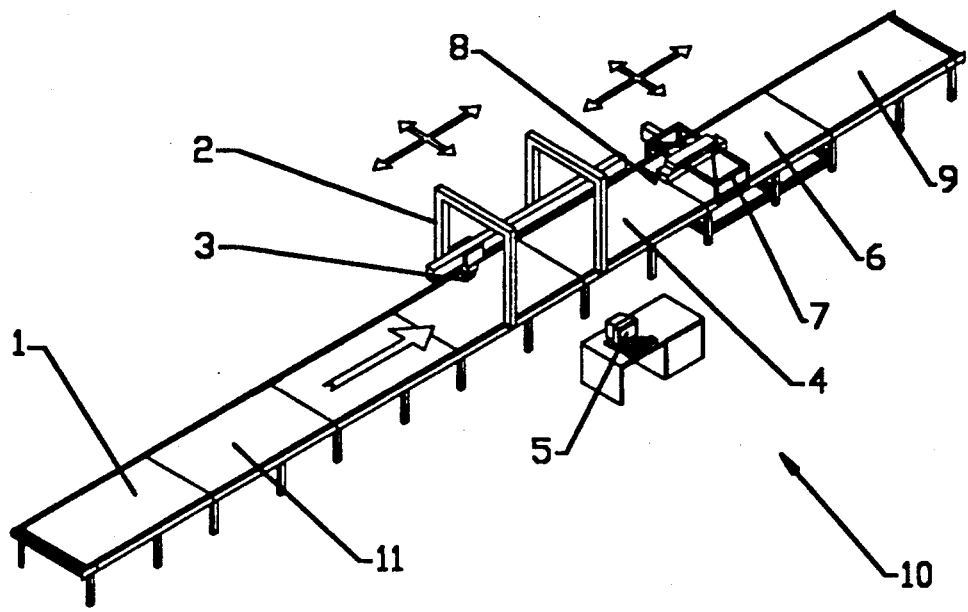
FIG. 1 illustrates a perspective representation of a first embodiment of the patterned web cutting machine according to the present invention.
Figure 3:
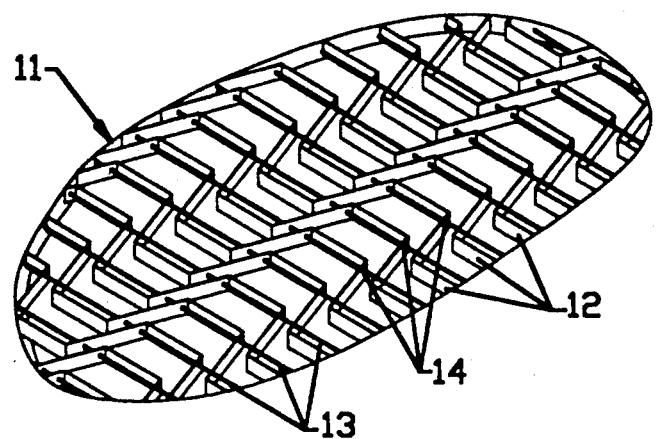
FIG. 3 illustrates a flat wire conveyor according to the present invention.

Referring now to FIG. 1, a first embodiment of the fabric cutting machine of the present invention will now be described. The machine 10 uses a laser 8 for cutting, however a conventional reciprocating knife and its associated brush table may also be used. A water jet, such as the Water Jet System marketed by Flow Systems, Kent, Wash. or the Water Cutting System marketed by Ingersoll-Rand, Baxter Springs, Kans. may also be used. When using a laser, the conveyor 11 must be made of a material that will not be damaged by the laser as it cuts the fabric. The laser must also not be reflected back. In addition, smoke generated by the burning action of the laser must be removed. When using a water jet, splashback must be minimized. Machine 10 includes a flat wire belt conveyor 11 for this purpose. The conveyor may be made of stainless steel, as shown in FIG. 3. A flat wire conveyor is manufactured by Ashworth Brothers, Inc., Winchester, Va.; however the flat-wire belt's advantages when used with a laser or water jet cutter have heretofore been unrecognized.

Referring to FIG. 3, the flat wire belt comprises a plurality of nested, serpentine flat wire sections 12, each of which is maintained in its nested and serpentine relationship by rods 13 which pass through appropriate holes 14 of at least two adjacent flat wires. The opposing faces of the flat wires 12 face one another in the nested serpentine pattern and are maintained parallel to the path of the laser beam. The flat wire conveyor provides minimal exposure of the conveyor to the laser, but fully supports the fabric. Conveyor flexibility is maintained, and generated smoke may be exhausted.

Referring again to FIG. 1, the conveyor 11 runs the full length of the machine 10 to eliminate any transfer of the fabric from one surface to another as it is transported down the machine. In order to accurately move the fabric through the machine under operator control, the conveyor is controlled by workstation 5, with the conveyor position being communicated to the workstation via a position encoder, resolver or other well known device. An example of a position encoder for a conveyor is the Model 23 marketed by Dynamics Research Corp., Wilmington, Mass.

The first section of the machine is a spreader section 1 and is used to manually or automatically spread out the fabric to be cut. Any wrinkle or bow in the fabric may be manually removed and the selvage (edge of the fabric) may be straightened. In addition, the spreading operator can tag all of the defects in the fabric with highly visible tags, such as silver dots made of pressure sensitive tape.

As the fabric is conveyed down the machine, it stops at the image capture or video station 4. This station contains a video camera 3, mounted on an elevated, two-axis servo controlled gantry 2. The video image from this camera is displayed on a graphics workstation 5, described in detail below.

In order to move each template of the pattern to its exact location, the operator must be able to zoom up close to the fabric so that the workstation display will display a magnified or close up view of the area of interest in the fabric. Accordingly, each axis of motion of the video camera and the zoom lens of the camera is equipped with a feedback device to inform the computer of its actual location at all times. The feedback devices may be optical incremental encoders that output a digital pulse for each increment of motion. These feedback devices may also be resolvers, absolute optical or any other suitable feedback device as are well known to those having skill in the art.

When the fabric is spread on the conveyor at spreading station 1, the spreading operator informs the computer 5 of the type of fabric and the style of furniture to be covered with this fabric. The computer accesses its data storage device and finds the appropriate template pattern for this combination of fabric type and furniture style, from a library of template patterns stored therein.

It is assumed that a template pattern for perfect fabric for the furniture style to be cut, has been previously generated and entered into the computer's data storage device. The computer retrieves this pattern and loads it into its working memory. This pattern is placed in memory in an area representing the area of the conveyor immediately behind the previous pattern being cut. As the conveyor is moved down the machine, its feedback device causes the computer 5 to index all of the digital pattern templates in memory the appropriate amount so as to always have the appropriate patterns in the same place relative to the conveyor.

The operator, through the workstation 5, views the actual fabric under the video camera 3 at a scale equal to the zoom setting of the camera lens. The operator may pan the view by moving the camera in the "X" or "Y" direction with a joy stick or "jog" buttons. The scale of the view is controlled by the operator with a camera zoom control. Because the gantry 2 and camera lens motor have position encoders, the computer knows the camera's actual location and the lens zoom parameters.

The computer includes a graphical representation of each template in the total pattern and knows their locations relative to the conveyor. Accordingly, the computer pans and zooms this digital image relative to the camera location and the camera lens zoom setting. The mixed video image of the fabric and the digital image of the pattern templates are kept in their proper relationship as the camera is moved and the lens zoom setting is changed. The operator may thereby view the template relationship to the actual piece of fabric displayed on the display. The workstation 5 includes another facility that allows the operator to move the digital image of the individual templates in a pattern relative to the conveyor and therefore relative to the actual fabric, before the fabric is indexed into the cutting station 6.

In operation, the operator picks an individual displayed pattern template with a pointing device ("mouse") or other input device and moves it to a new location. When each pattern template is in its exact location for proper cutting, the operator indicates, for example using the pointing device, that it is permissible for the cutting station 6 to cut this template. These individual pattern templates are converted into a cutting instructions, taking into account their new location relative to the conveyor. When all of the pattern templates in a zone the size of the cutting area adjacent to the cutting section 6 have been tagged for cutting, and the cutter 8 is finished cutting the fabric presently in the cutting section of the machine, the conveyor indexes the section of fabric in the cutting section into the unload station 9, and indexes the fabric out of the image capture station 4 into the cutting station 6. Cutting may then start, and the operator can continue to nest the remaining pattern templates to the remaining fabric on the conveyor.

The two-axis servo controlled cutting station gantry 7, carrying the laser 8, will now be described. A suitable laser is marketed by Directed Energy, Inc., Irvine, Calif. Mounted adjacent to the laser burn lens is a label printer for example a Model 300A marketed by Intermec Corp., that can dispense bar codes and or character labels on demand, and apply the label directly to the fabric. Mounted adjacent to the laser burn lens is also a marking or air operated chalking system, which can apply a chalk mark or line directly onto the fabric. The markings are later used as an upholstering aid. Both the label and the markings can be applied directly onto the surface of the fabric because there is no plastic film covering the fabric. A covering film is not required because the laser does not apply a side load to the fabric when cutting.

Overview: Fabric Cutting With Digital Image Storage

Figure 2:
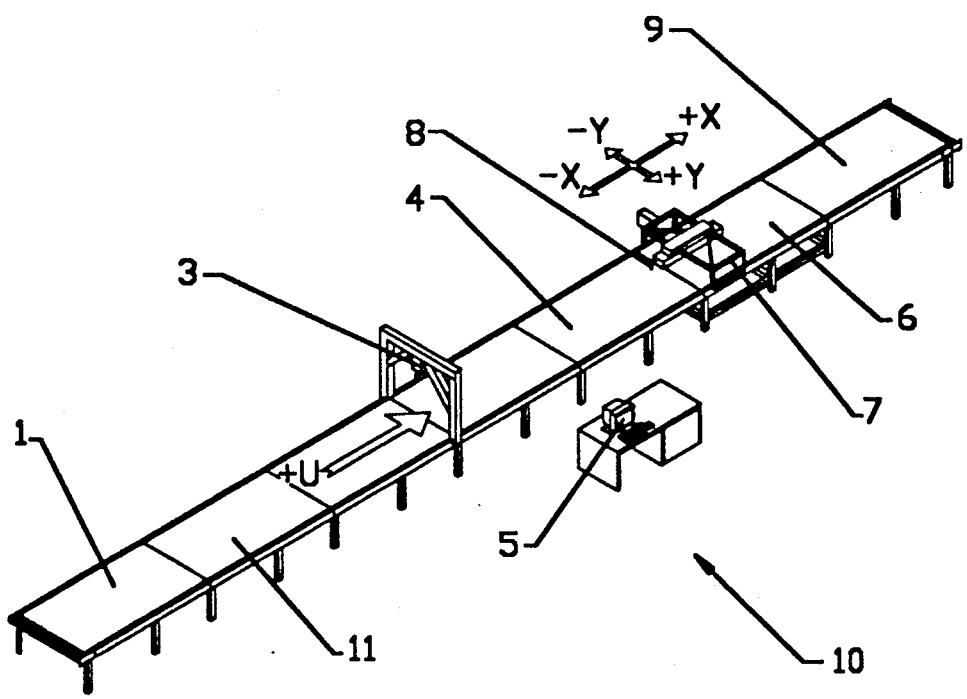
FIG. 2 illustrates a perspective representation of a second embodiment of the patterned web cutting machine according to the present invention.

In order to accurately match patterned fabric, the present invention allows the machine operator to move each individual template of the pattern to its exact position before cutting begins. The cutting system therefore must have the capability to pan and zoom the image of the fabric and of the nested templates to the area of interest on the fabric. The operator must see an overview of the area of the fabric being nested as well as a close up view of an individual template or small area. In the embodiment of FIG. 1, panning and zooming are accomplished by physically moving the camera and lens. In the embodiment of FIG. 2, an image of the fabric is captured, digitized and stored in the workstation memory. Panning, zooming and other image manipulation is accomplished digitally, at high speed, without requiring physical movement of the camera and zoom lens. Accordingly, a stationary camera without a zoom control may be used. A movable camera may also be used in connection with stored image manipulation.

Referring now to FIG. 2, the first section 1 of the machine 10 is the spreader section and is used to spread out the fabric to be cut. Any wrinkle or bow in the fabric may be manually removed and the selvage or edge of the fabric may be straightened. In addition, the spreading operator can tag all of the defects in the fabric with highly visible tags such as silver dots made of pressure sensitive tape.

As the fabric is conveyed down the machine by conveyor 11 and enters the nesting section 4 of the machine, immediately in front of the cutting section 6, it passes under a digital or analog video camera or scanning device 3.

There are three types of video cameras commercial available. The first is a gray scale camera, also known as black and white. An example of this type of camera is the Model TI-24A marketed by NEC, Wood Dale, Ill. The second and third types are both color cameras, however their outputs may also be displayed in gray scale. One type of color cameras has only one image capture element. The one element color camera also has a color wheel that rotates in front of the capture element. Three consecutive pictures are captured and output one at a time (one for each primary color). Because three images are required for color, they cannot be taken at the exact same time. This type of camera is known as a "slow scan" camera. This extended time requires the fabric to be stopped each time an image is taken. A slow scan camera is marketed by NEC, Wood Dale, Ill. as the Model NC-15. The second type of color camera has three picture capture elements and can therefore take all three primary color images at the same time. Most three element cameras do not require that the fabric be stopped while the image is captured. An example of a three element color camera is the Model TK-F7100U marketed by JVC, Elmwood Park, N.J. Depending upon the operating speed of the machine, any of the above types of cameras may be used.

The capture element in a video camera consists of an array of individual picture elements known as "pixels" Some cameras include only a linear array cell (a single row of pixels). Most video cameras have a rectangular array of pixels. Commercial resolution for video is 512×512 pixels. European standard video has 640×480 pixels. Industrial cameras range from the low of 512×512 up to linear array cameras of 4000 pixels. More individual pixels output a higher resolution image. Most high resolution inexpensive cameras are the "slow scan" type. Real time high resolution three element cameras sell for approximately ten times more than high resolution "slow scan" types.

In the embodiment of FIG. 2, a color image of the fabric is taken. This image is captured in the computer 5, through a hardware device known as a frame grabber (not shown in FIG. 2). Frame grabbers are manufactured by Data Translation (Marlboro, Mass., Model DT2851), Matrox (Dorval, Quebec, Model IM-ASD), True Vision (Indianapolis, Ind., Model ATVista) and others. The resolution of the camera relative to the width of the fabric taken by the camera determines the area of fabric represented by one pixel of the total pixel image. The frame grabber digitizes the image and transfers this digitized data into a storage device for example a random access memory, a magnetic or optical disk drive or other video memory. High performance video boards or high performance graphic engines can rapidly move digital images from rapid access memory to the workstation graphic screen and may provide basic image manipulation functions such as translate, rotate and zoom. Commercial hardware for this function is marketed by True Vision (Indianapolis, Ind., Model ATVista), DuPont Pixel Systems (Newark, Del., Model GIP), Pixar Inc. (San Rafael, Calif., Model PixarII), DataCube (Peabody, Mass., Model MaxGraph), Matrox (Dorval, Quebec, Model IM-1280), Data Translation (Marlboro, Mass., Model DT2858), and others.

The embodiment of FIG. 2 may capture more than one frame of fabric image (i.e. more than would normally be viewed on the screen at one time). For example, 20 feet of fabric image may be captured and stored in rapid access memory. More or less fabric image may be stored in rapid access memory. The amount of fabric image stored in rapid access memory is determined by the resolution of the camera and the amount of rapid access memory available. The vector representation of the individual pattern templates are also stored in rapid access memory.

Since the image of the fabric and the pattern templates are in rapid access memory, the computer, through hardware and software control, can pan and zoom around at the request of the operator. Because the camera and lens do not physically move, the pan and zoom function can be operated at high speeds with high reliability.

Overview: Machine Controller Operation

The general operation of the machine controller of the present invention will now be described. As stated above, the controller comprises a computer or workstation 5, for example a widely available Compaq 486 25 mHz workstation using the widely available AT&T UNIX System V operating system with real time extensions. A detailed description of the hardware and operating system need not be provided. The detailed hardware connection of the controller to the other elements of the machine 10 will be described below.

Operational control of the machine 10 may be implemented in software running on workstation 5. A general description of this software will now be provided.

The multitasking feature of the UNIX operating system allows several operations or tasks to take place simultaneously and allows these simultaneous tasks to communicate with each other. The software is organized into the following main tasks or operational modules:

Nesting:

Control of the graphic screen display and the computer operator user interface for nesting of templates relative to the fabric. This task also contains the frame grabber control and camera control.

Cut Queue:

Control of the cut program compiler for converting the nested template patterns into cutting instructions, maintaining the cutting instructions in a queue, and feeding the instructions to the cutter when ready.

Database Interface:

Control of the main database containing the template patterns.

It will be understood by those having skill in the art that workstation 5 may directly control the gantry, laser, conveyor, printer, and all critical input and output (I/O) such as the emergency stop button, laser on-off, and other safety related functions, if present, using the operating system real time extensions. Alternatively, a commercially available Computer Numerical Control (CNC) controller may be provided between these peripheral devices and the workstation to directly control these devices. CNC controllers are widely available from many suppliers such as the Model 8400 marketed by Allen Bradley (Cleveland, Ohio). An internal CNC control card for a workstation is marketed as the DMC/600 by Galil Motion Control, Inc., Palo Alto, Calif.

Figure 4:
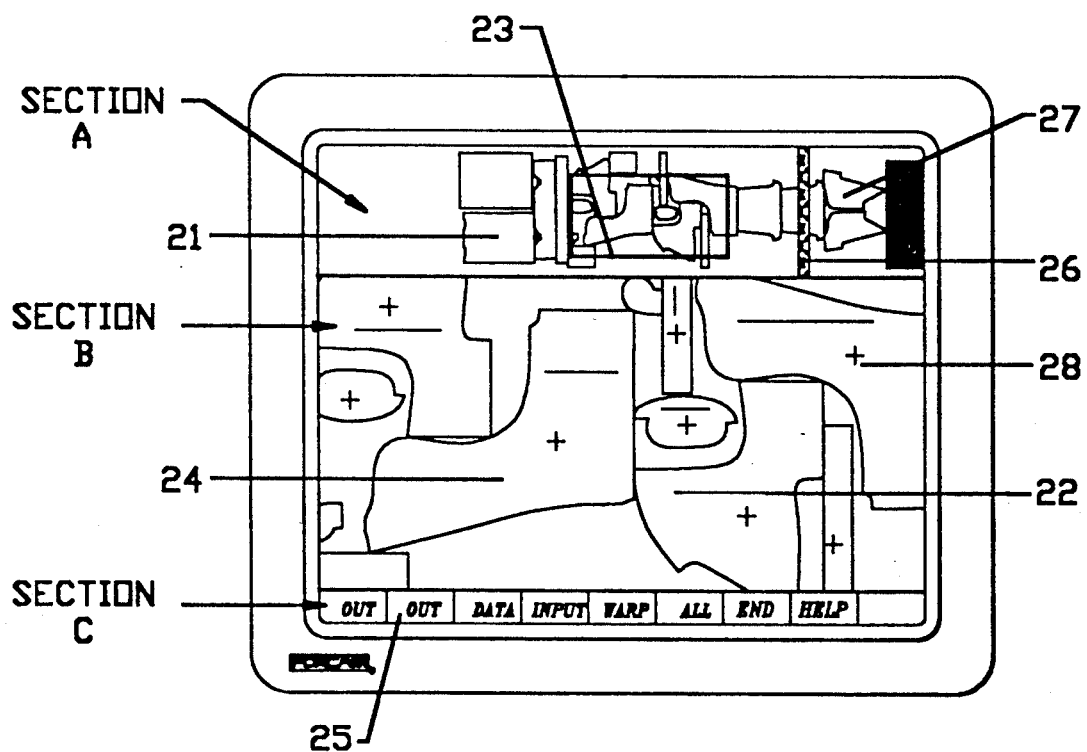
FIG. 4 illustrates a graphic display layout for the patterned web cutting machine according to the present invention.

Referring now to FIG. 4, under control of the Nesting task the workstation's display screen of workstation 5 is partitioned into three sections. Top Section A is an area that contains the template patterns 21 that have previously been initially nested for a perfect piece of fabric. Middle Section B contains the image of the fabric in addition to part of the pattern templates associated with that area of fabric 24. Bottom Section C is a menu area containing icons or selection choices 25, that may be selected for different functions. It will also be understood by those having skill in the art that multiple display screens may be used, with sections A-C being displayed on different ones of the multiple display screens.

After the fabric is spread onto the machine conveyor at spreader station 1, the operator enters the fabric number and the furniture style number into the workstation 5. The Database Interface task accesses the database for the appropriate initial nest pattern that has been previously made for that furniture style and a perfect piece of this type of fabric, and passes the appropriate pattern to the Nesting task. The Nesting task receives this pattern and displays it in Top Section A of the graphic screen as shown at 21. The video camera 3 (FIG. 2), captures the image of the fabric and places that image in the workstation's rapid access memory.

Top Section A of the graphic screen is associated with the conveyor. As the conveyor moves down the machine, the image displayed in Section A of the screen moves at the same relative rate. The "bar" 26, in Section A of the screen, controls the movement of the conveyor. The operator picks this bar and moves it to the left. As this bar is moved, the Nesting task communicates with the Cut Queue task telling the Cut Queue task that the conveyor may be moved a distance represented by the position of the bar. As will be described below, any pattern templates in this section that are completely to the right of the bar may be cut by the laser 8.

The Cut Queue task also tracks the relative position of the conveyor 11 and compiles a numerical control program. This numerical control program includes a conveyor stop at the appropriate distance (for example every 42) for the camera to grab a frame of image, if the system does not use a "real time" camera. The Cut Queue task directs the CNC controller to move the conveyor the appropriate amount, either to the position of bar 26, or to the position requiring a new frame of fabric image. If a new frame of fabric image is required, the Cut Queue task moves the conveyor to the appropriate position, stops the conveyor and then notifies the Nesting task to grab the next frame of fabric image. After the Nesting task grabs this next frame of fabric image, it notifies the Cut Queue task that the frame grab is complete and the Cut Queue then moves the conveyor the appropriate amount.

The system may contain enough rapid access memory (i.e. 4 megabytes) to hold twenty feet of fabric image. As the conveyor is moved to the right, the fabric image associated with the area of the conveyor that is no longer visible in section one of the graphic screen is discarded and this empty memory is then available for the next section of the fabric image to be grabbed.

The window 23 in Section A is controlled by the computer operator using for example a three button mouse (pointing device), and the section of the pattern templates that are displayed inside the window 23 are also displayed in Section B of the graphic screen, superimposed upon the corresponding image of the fabric.

The operator controls the window 23 with the three button mouse. By placing the mouse cursor in the window and pressing the center button on the mouse, the operator can pan the window (move the window up and down as well as left and right) around the area in Section A of the graphic screen that represents the conveyor. If the mouse cursor is in the window and the center button on the mouse is depressed, pressing the left button on the mouse zooms the window larger and pressing the right button zooms the window smaller. The section of the pattern templates and the associated image of the fabric inside the window are displayed in Section B of the graphic screen. By zooming the window smaller, the amount of the pattern templates and the associated area of the fabric inside the window is reduced and therefore the image displayed in Section B of the screen is magnified. This gives the computer operator the ability to see very fine detail in the fabric and match the pattern templates to the fabric with high precision.

Should no fabric be present on the conveyor, an image of the conveyor would be displayed in Section B of the screen. The window 23 is associated with the conveyor, therefore, the window 23 moves with the relative motion of the conveyor in Section A of the graphic screen. Since the window moves with the relative motion of the conveyor, the image of the pattern templates inside the window and its associated fabric image moves with the window and the image of the pattern templates and associated fabric image displayed in section two of the graphic screen does not change.

Overview: Template Pattern Matching

The computer operator has the ability, via the mouse, to move the bar 26, the window 33, the total cut pattern 21, or any individual template 24 of the pattern. In operation, the computer operator moves the bar 26, the window 23, and the total cut pattern 21, until the right edge of the fabric appears in Section B of the graphic screen. When the right edge of the fabric appears, the computer operator moves the total cut pattern, relative to the image of the fabric, to a position where the match point 28 of the first individual pattern template matches the first significant match point in the image of the fabric. This function may be accomplished by selecting the icon in Section C of the graphic screen marked "ALL" and then moving the mouse cursor to any part of the total cut pattern and selecting the center pick button on the mouse. With the mouse cursor on any pattern template and center pick button on the mouse selected, the computer operator may move the total pattern template up and down or left and right relative to the conveyor and therefore relative to the fabric image.

If the fabric was perfect, the computer operator would only have to notify the Cut Queue to cut all of these pattern templates. This would be accomplished by moving the bar 26 to the left side of the pattern templates in Section A of the graphic screen.

Since the fabric is typically not perfect, the operator must move each individual template of the pattern so that each template of the pattern is aligned to the actual piece of fabric on the conveyor. This may be accomplished by moving the mouse cursor over each individual template 24 of the pattern and depressing the center button on the mouse to activate each template of the pattern for the move function. With the center button of the mouse depressed while the mouse cursor is inside the boundary of an individual template, the operator may move (translate) the selected pattern template up and down or left and right to align it with the image of the actual piece of fabric to be cut. For example, the match point 28 of each individual pattern template is aligned with an appropriate flower in the fabric if flowers are the significant items in the fabric design. While each template of the pattern is selected, it may be rotated clockwise with the right mouse button or counterclockwise with the left mouse button. Each depression of the left or right mouse button rotates the individual pattern template a small increment (for example 0.5 degrees).

The above described functions solve most cutting errors. There is one type of cutting problem that is not solved with these functions. This problem occurs when the warp threads (running the length of fabric) are relatively straight but the filler threads (running from selvage to selvage) are skewed, i.e. not perpendicular to the warp. In order to cut fabric with this type of defect, the pattern templates need to be warped so that the top and bottom of the pattern templates line up with the warp threads and the sides of the pattern line up with the filler threads. Not all pattern templates are rectangles. However, most pattern templates that are critical and are not rectangles include a line 22 that represents the grain direction. By selecting the "warp" icon from Section C of the graphic screen, the operator is able to warp individual pattern templates.

The warping function operates by first moving and rotating the pattern template to be warped until the grain direction or some edge of the pattern template is lined up with the grain of the fabric. Next, the operator selects the warp icon in Section C of the graphic screen. The operator then picks, one at a time, both ends of an edge of the pattern template or its grain direction 22 that is aligned properly. The operator next places the mouse cursor inside the pattern template to be warped and depresses the center mouse button. Using the two outside mouse buttons, the pattern template is warped by holding the piece of the pattern previously selected stationary, and maintaining all other sides of the pattern template at their original length. The right button warps the pattern template clockwise and the left mouse button warps the pattern template counterclockwise.

It will be understood by those having skill in the art that a template cannot always be warped by some specified amount. For example, with one edge of the template fixed, and all lengths of the sides remaining fixed, there is a limit to how much "swing" the template has. Accordingly, if a warp is requested which is impossible, the present invention allows the user to "custom" warp the template, in order to change the lengths of the individual sides. Operation of the custom warping function will be described below.

By using the mouse, the computer operator may manipulate both the window 23, and the individual templates of the pattern until all of the pattern templates are aligned to the image of the fabric being processed.

Overview: Fabric Cutting Based Upon Nested Templates

For the processing of the fabric to continue, the operator must notify the workstation 5 that the individual templates of the pattern are aligned to the image of the fabric, and that the laser 8 may cut the aligned pattern templates. This is accomplished by selecting the slide bar 26 with the mouse and sliding it to the left. By moving the slide bar 26 to the left, the operator notifies the computer that all of the pattern templates completely to the right of the slide bar are aligned satisfactorily with the fabric on the conveyor to the right of the slide bar and that the cutter 8 may cut this fabric.

After the operator has released the slide bar, the Nesting task notifies Cut Queue task to cut all of the individual pattern templates that are completely to the right of the slide bar.

As previously described, the conveyor 11 may index the fabric down the machine a distance equal to the length of the cutting section 5 (FIG. 2). For optimum production, this index takes place at the conveyor's fastest run speed. This index is distracting to both the computer operator, the operator spreading the fabric, and the operator unloading the machine on the output side 9 (FIG. 2) of the cutting section. The embodiment of FIG. 2 may eliminate this rapid index by moving the conveyor small increments at a slow speed while the laser 8, carried by the gantry 7 (FIG. 2), is cutting the fabric.

The conveyor index while cutting is in process operates as follows: After the Cut Queue task is notified to proceed cutting all pattern templates completely to the right of the slide bar 26 (FIG. 4), the compiler in the Cut Queue task must calculate a cut program. This cut program must account for the actual location of each pattern template relative to the conveyor, the conveyor stops required by the frame grabber in the Nesting task as well as the location of the label to be applied (if any) while the cutting action is proceeding. The location of the label inside of any individual cut piece and all label information is contained in the database. This label information is retrieved from the database and passed to the Nesting task and then to the Cut Queue task at the same time all other pertinent information about the pattern templates is passed.

There are three axes of motion used in the cutting process. The axis up and down the length of the machine is defined as the X axis (FIG. 2) with the X+ direction toward the output 9 of the machine. The laser moving in the axis across the fabric is defined as the Y axis (FIG. 2) with the Y+ direction being to the left facing the input of the machine. The conveyor moves towards the output of the machine in the U+ axis (FIG. 2).

The total cut path length and its greatest X+ point on the cut path is calculated by Task Three. The Cut Queue task compiler, using the greatest X+ point on the cut path, selects the pattern template with the closest X+ point for cutting next. If pattern template No. 1 was to be cut, and pattern template No. 2 were next to be cut, the compiler would calculate the distance between the greatest X+ point on pattern template No. 1 to the greatest X+ point on pattern template No. 2. The compiler then obtains the total cut path length of template No. 1 and divides it into the distance between template No. 1 and template No. 2. This division calculates a ratio equal to the distance the conveyor must move for each move along the cut path of pattern template No. 1, so that the pattern template No. 2 is located at the same X distance of the gantry that pattern template No. 1 was before pattern template No. 1 was cut. In this way the laser always starts cutting each template of the pattern at the same X location of the gantry.

For example:

```
If cut length for pattern template No. 1 = 100";
and Distance between X+ template No. 1 and X+
template No. 2 = 5";
Then 5 / 100 = .05; and
For each inch of cut on pattern template No. 1, the
conveyor must move .05".
```

The original pattern template for template No. 1 consisted of X and Y moves. The original pattern template assumed that the conveyor was stationery during the cut. This X, Y cut path is now converted to X, Y, and U. For each move in the cut path, a U increment is added. The U increment is always in the positive direction and therefore, the same increment must be substrated from the X element of the original cut path. For example, assume a rectangle was to be cut in incremental motion as follows:

```
GOTO  XO    YO
GOTO  XO    Y40
GOTO  −X10  YO
GOTO  XO    −Y40
GOTO  X10   YO
```

This would cut a rectangle 10" by 40" with a total length of 100" of cut. Using 5" as the distance between the greatest X+ point of pattern template No. 1 and greater X+ point of pattern template No. 2, the new cutting instructions would be as follows:

```
GOTO  XO  YO  UO
```

```
                           -continued
GOTO  −X(.05 × 40) Y40 U(.05 × 40),
   GOTO −X2 Y40 U2
GOTO  −X10−(.05 × 10) YO U (.05 × 10),
   GOTO −X10.5 YO U.5
GOTO  XO−(.05 × 40) −Y40 U(.05 × 40),
   GOTO −X2 −Y40 U2
GOTO  X10−(.05 × 10) YO U(.05 × 10),
   GOTO X9.5 YO U.5
```

In this example, the original X axis moved +10" and −10" for a composite move of 0" while the conveyor was stationary, but moved a composite move of −5" while the conveyor moved +5".

The feed rate of the conveyor is determined by the cutting speed of template No. 1. In the above example, the conveyor would move a speed equal to F (cut speed for template No. 1 in inches per minute) ×0.05" per minute. By using this method to index the fabric down the machine, the operators spreading the fabric and unloading the machine can work at a casual pace and they do not have to stop while the conveyor indexes. Another advantage of this type of conveyor feed is that there is no loss time in the production cycle while the conveyor is feeding.

DETAILED DESCRIPTION

Component Interconnection For Fabric Cutting System

Figure 5:
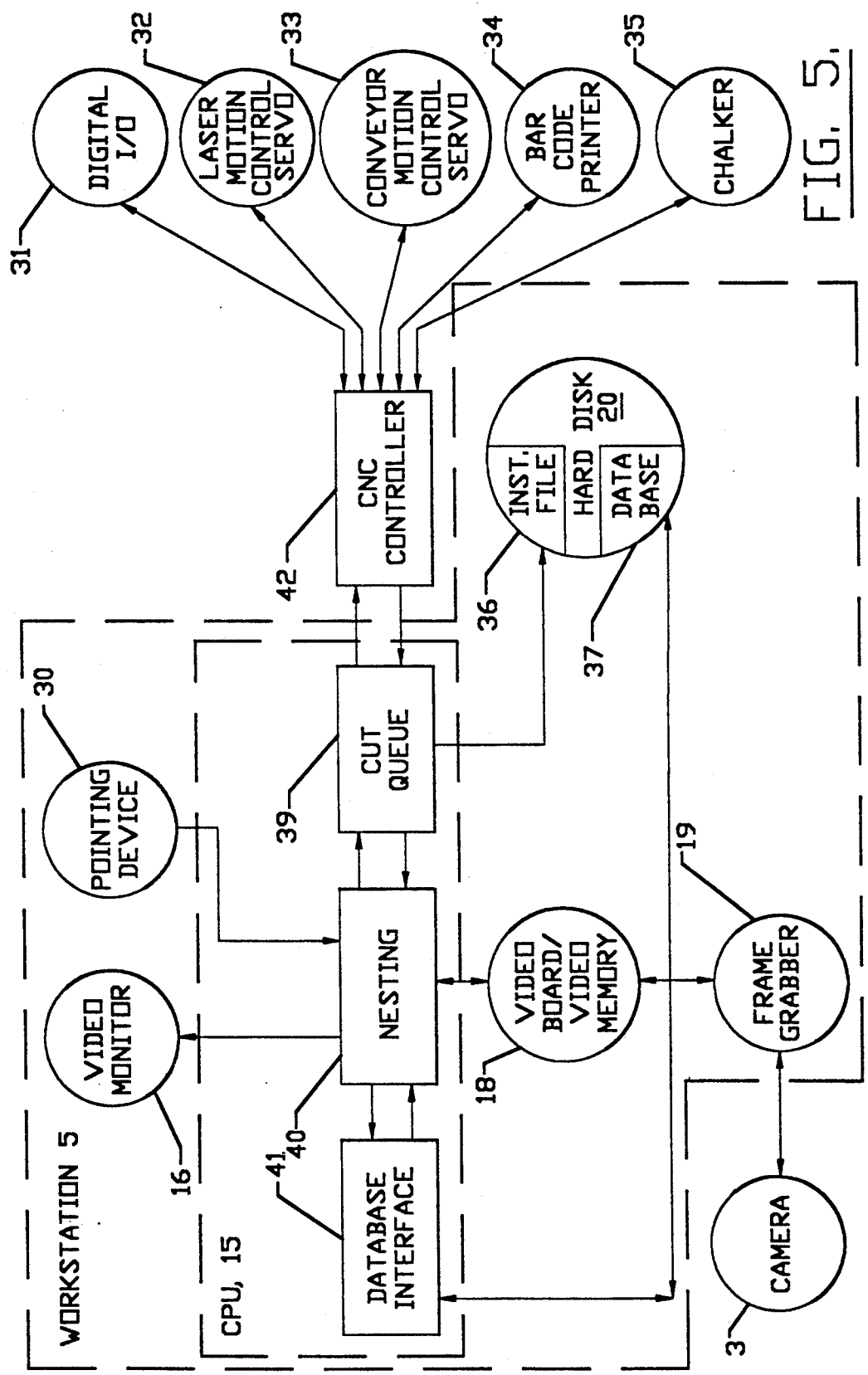
FIG. 5 illustrates a component interconnection for the patterned web cutting machine according to the present invention.

Referring now to FIG. 5, a detailed description of the hardware and software modules contained in the workstation 5 (FIGS. 1 and 2), and their interconnection with the other hardware elements of the fabric cutting machine 10 (FIGS. 1 and 2) will now be described. Referring to FIG. 5, the workstation 5 is electrically connected to camera 3 for capturing fabric images, via frame grabber 19 and video board/video memory 18. It will be understood by those having skill in the art that frame grabber 19 and video board 18 may be printed circuit cards installed in the workstation 5. Alternatively, free standing units may be used.

The workstation 5 is also connected to a digital input/output system 31 for interfacing with various switches on the system. The switches may be used to turn on or off various components or to receive system feedback such as laser on/off, printer on/off, start button, etc. The motion control servos 32 for the laser cutter 8 are also connected to workstation 5. Similarly, the servos 33 for the motion control of conveyor 11 are also connected. An optional bar code printer 34 or label maker, described above, is also connected, as is chalker 35. It will be understood that these peripherals 31-35 may be directly connected to the workstation 5, and may be controlled by a "machine control" task in workstation 5. Alternatively, as shown in FIG. 5, a Computer Numerical Control (CNC) unit may interface all these peripheral devices to the workstation 5. Use of a commercially available controller obviates the need to generate a customized control program for each of these peripherals.

Still referring to FIG. 5, workstation 5 includes a central processing unit (CPU) or system unit 15 which runs a number of operational modules (also referred to herein as "tasks") to control the operation of the system. The CPU 15 is connected to a high resolution color or monochrome video monitor 16, the screen of which was described in connection with FIG. 4. A pointing device (mouse) 30 is also included in workstation 5 for use as described above.

Also included in workstation 5 is a hard disk 20 which may be a 320 megabyte hard disk or an erasable optical disk. The hard disk 20 includes a database of template patterns 37 thereon and also includes an instruction file 36 for storing cutting instructions therein.

CPU 15 includes a number of modules or tasks each of which will be described in detail below. While it is understood by those having skill in the art that each of these tasks may be implemented by specialized hardware, in the preferred embodiment these tasks are implemented via a software program running on CPU 15 under control of the UNIX operating system. The Nesting task 40 obtains the video image from the video board 18, obtains the templates from the database interface task 41, displays the superimposed video image and templates on video monitor 16 and allows manipulation of the superimposed images according to operator commands.

The Database Interface task 41 places templates in the database and retrieves templates from the database 37 contained in hard disk 20. The Cut Queue task 39 obtains a nested template pattern after nesting by the nest function 40 and converts this pattern into a set of cutting machine instructions which are placed in instruction file 36. The Cut Queue task 39 reads these cutting instructions from instruction file 36 when the section of fabric is at the cutting station.

The detailed operation of the functions (tasks) 39-41 will now be described in detail.

DETAILED OPERATION

Database Interface 41

Figure 6:
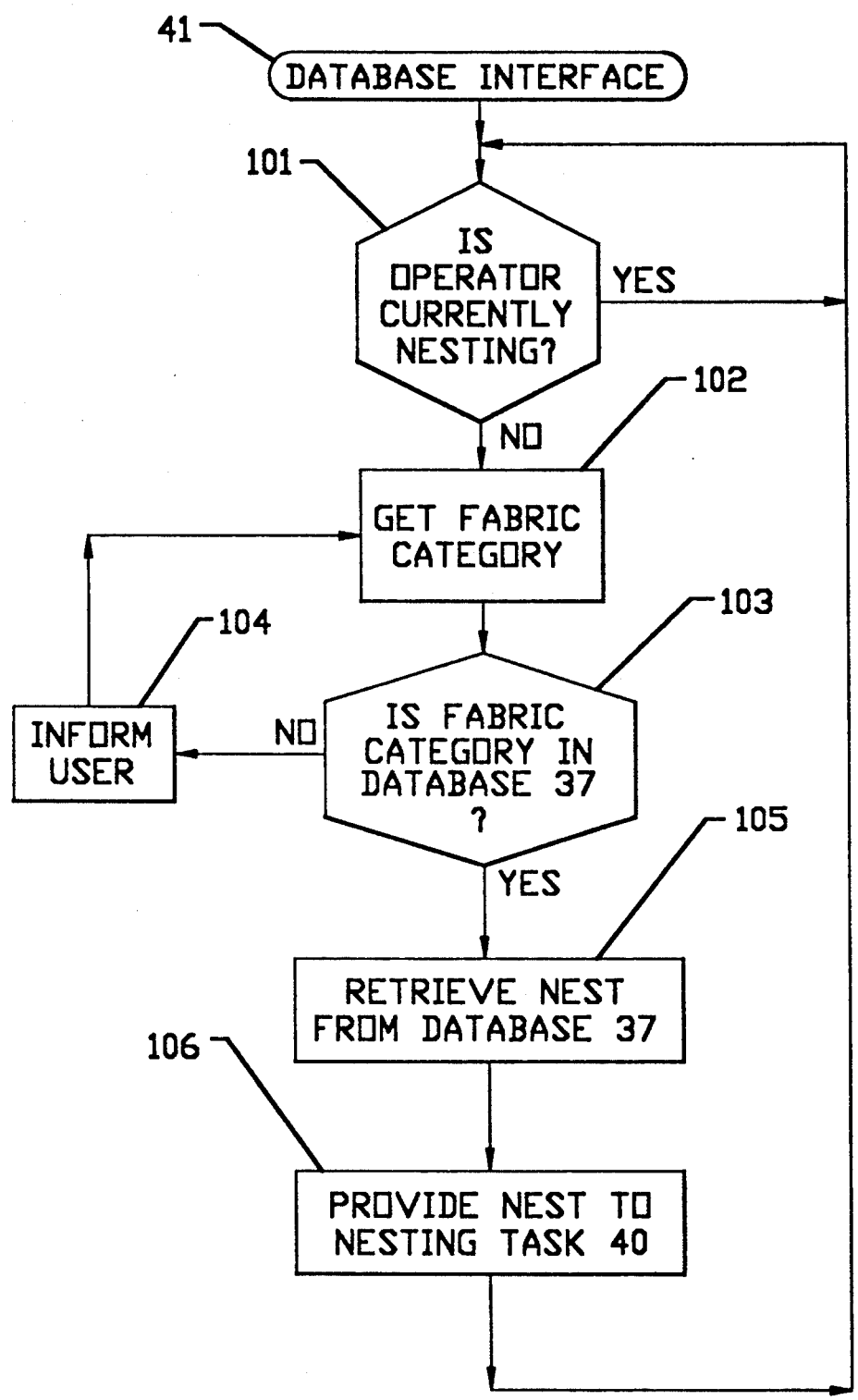
FIG. 6 illustrates the detailed operational flow of the database interface according to the present invention.

Referring now to FIG. 6, the detailed operations of the Database Interface task 41 (FIG. 5) will now be described. At Block 101, the Database Interface waits for a software signal, for example, in the form of an operating system interprocess communication signal, to indicate that previous nesting has been completed and that a new nest is desired. Then a prompt is provided to the user via video monitor 16 to obtain the fabric category at Block 102. Once obtained from the user, a test is made at Block 103 as to whether the fabric category is in the database 37. If not, the user is so informed at Block 104. If it is in the database, then at Block 105 the nest is retrieved from database 37. For each pattern in the nest, the data will be stored in the form of X, Y coordinates relative to an origin. A flag may indicate whether the coordinates are in English or metric units.

Then, at Block 106 the nest is provided to the Nesting task 40. When the Nesting task 40 signals to the Database Interface 41 that nesting is complete, the Nesting Task 40 will immediately attempt to read from a "named pipe" (a UNIX interprocess communication mechanism). Since no data will be in the pipe, the Nesting task will wait for data. As soon as the Database Interface 41 begins to retrieve data from the database 37, it will output it in this named pipe. The Nesting task 40 will then unblock and begin to read the data from the pipe. Reading data empties the pipe. This will continue until the Nesting Task 40 has all of the data describing the next nest. Processing then returns to block 101.

DETAILED OPERATION

Nesting 40

Referring now to FIG. 7 the detailed operations of the Nesting task 40 (FIG. 5) will now be described.

Figure 7A:
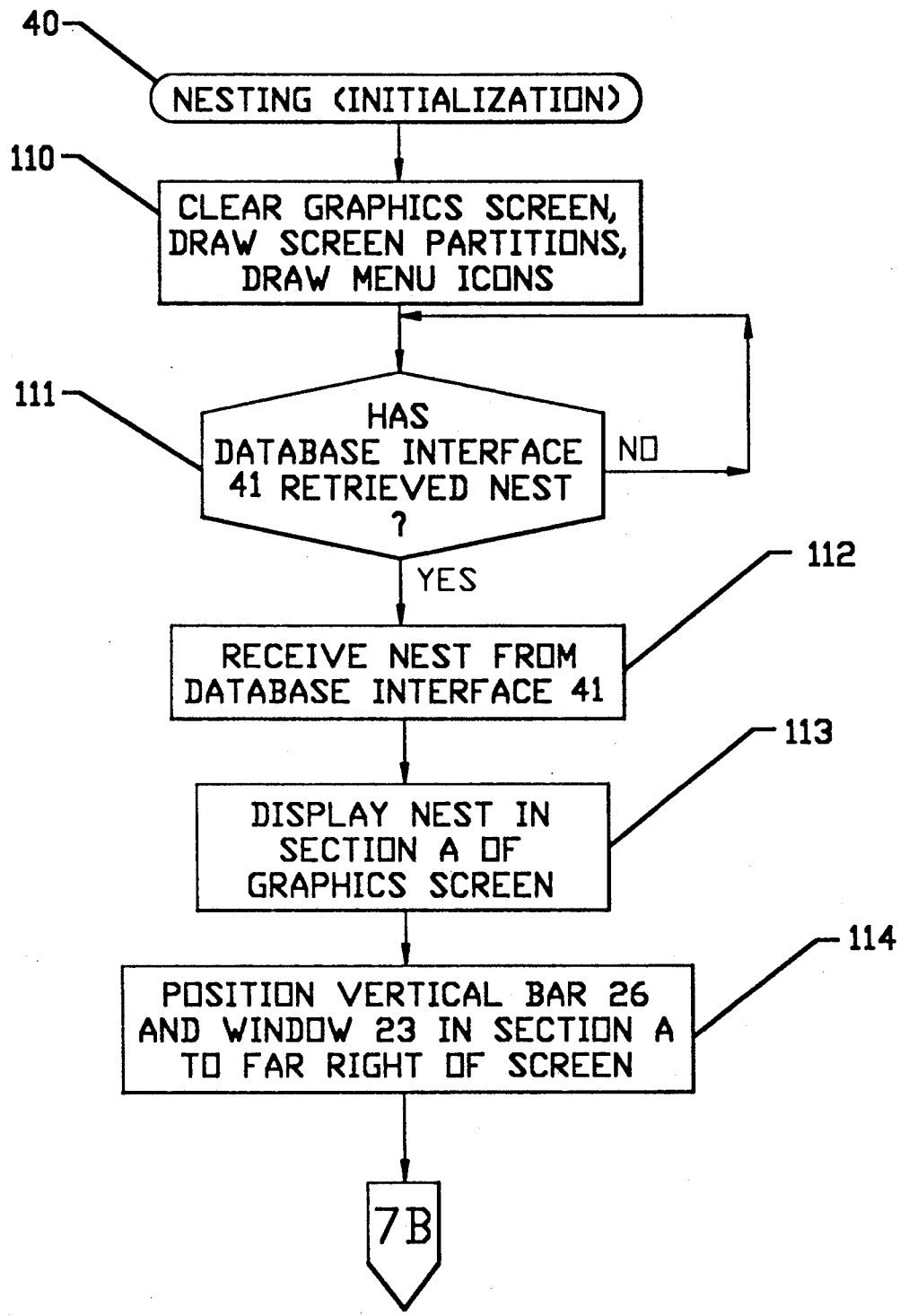
FIGS. 7a–7u illustrates the detailed operational flow of nesting according to the present invention.

FIG. 7A describes initialization of the Nesting task. First, the graphics screen (FIG. 4) of video monitor 16 (FIG. 5) is cleared, the screen partitions for Sections A, B, and C are drawn, and the menu icons 25 (FIG. 4) for Section C are drawn at block 110. Then, processing waits at Block 111 until the Database Interface 41 has retrieved a new nest, as described above in connection with FIG. 6. Once a new nest has been retrieved, the nest is received from the database interface 41 via a UNIX pipe at Block 112. At Block 113, the nest is displayed in Section A of the graphic screen of FIG. 4. At Block 114 the vertical bar 26 and the window 23 in Section A are positioned to the far right of the graphic screen. Then, processing continues in FIG. 7B.

Figure 7B:
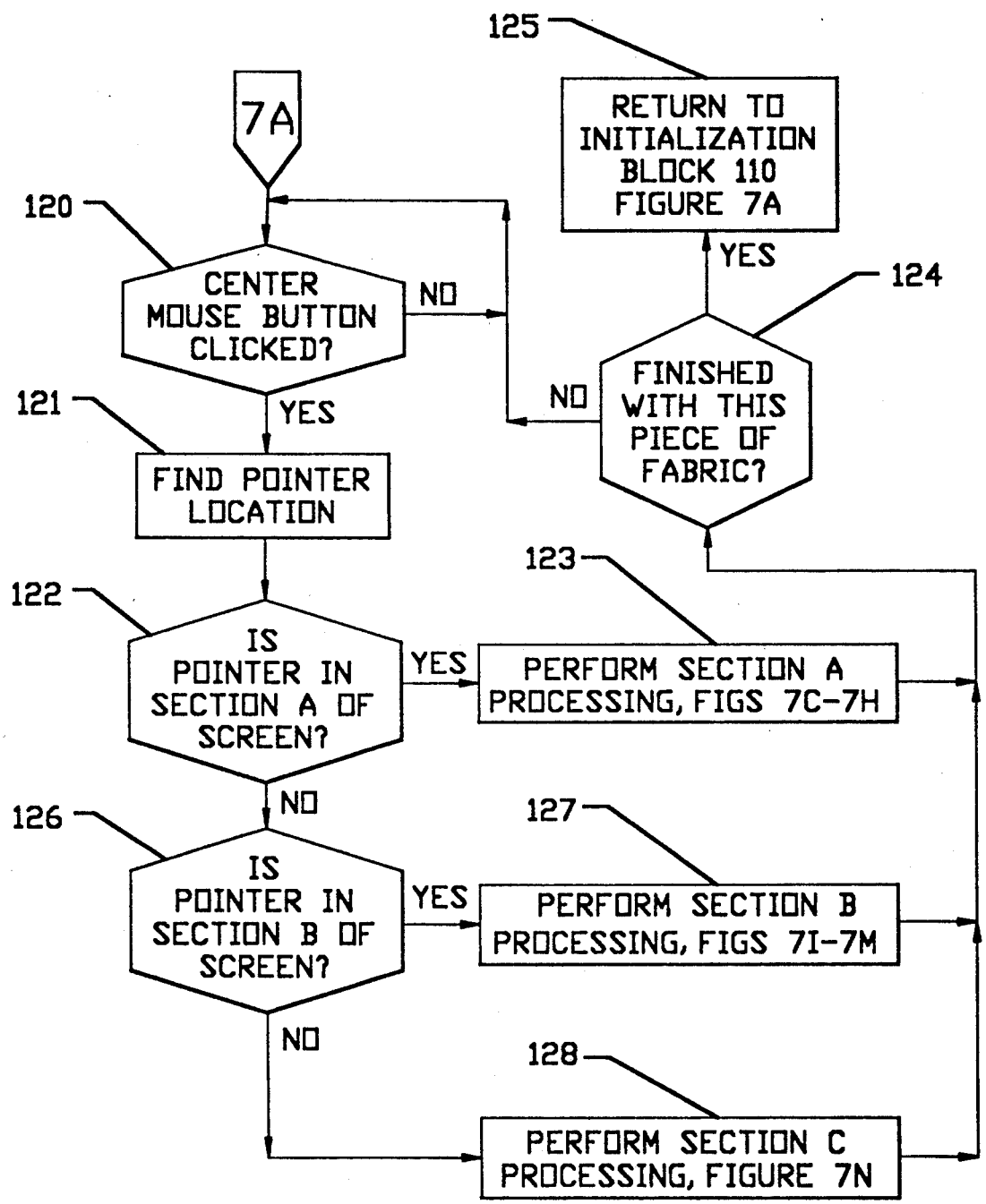

Referring now to FIG. 7B, processing continues by waiting for the center mouse 30 button to be clicked at Block 120. Once it is clicked, the pointer location is found at Block 121 and a test is made as to whether the pointer is in Section A of the screen at Block 122. If yes, then the Section A processing of FIGS. 7C-7H (described below) are performed at Block 123. After completion of Section A processing at Block 123 a test is made as to whether this piece of fabric is finished at Block 124. If not, processing returns to Block 120 to wait for the center mouse button to be clicked. If yes, then the operation returns to the initialization processing of Block 110 of FIG. 7A, at Block 125.

On the other hand, if the pointer is not in Section A of the screen (Block 122) then a test is made as to whether the pointer is in Section B of the screen, at Block 126. If yes, then the processing of FIGS. 7I-7M is performed at Block 127. On the other hand, if the pointer is not in Section B, then the pointer is assumed to be in Section C and the processing for Section C is performed (FIG. 7N) at Block 128.

Figure 7C:
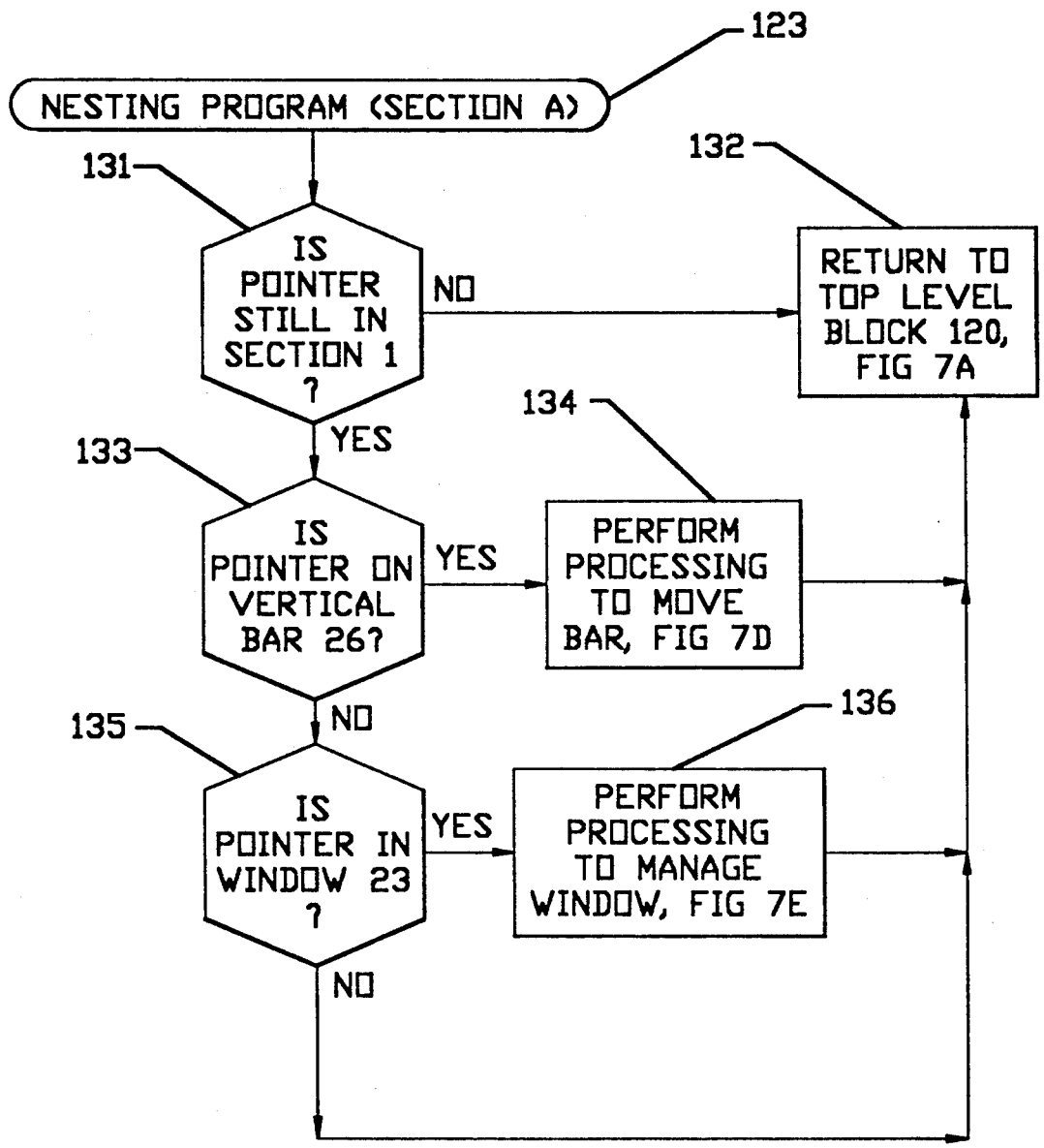

Referring now to FIG. 7C the processing of the nesting program for Section A will now be described. The processing of FIG. 7C begins from Block 123 of FIG. 7B. At Block 131 a test is made as to whether the pointer is still in Section A. If not, processing returns to Block 120 of FIG. 7A. If the pointer is still in Section A, a test is made at Block 133 if the pointer is on the vertical bar 26 (FIG. 4). If yes, then the processing to move the bar (FIG. 7D) is performed at Block 134. On the other hand, if the pointer is not on the vertical bar (Block 133) then a test is made as to whether the pointer is in the window 23 (FIG. 4). If yes, the processing to manage the window of FIG. 7E is performed at Block 136.

Figure 7D:
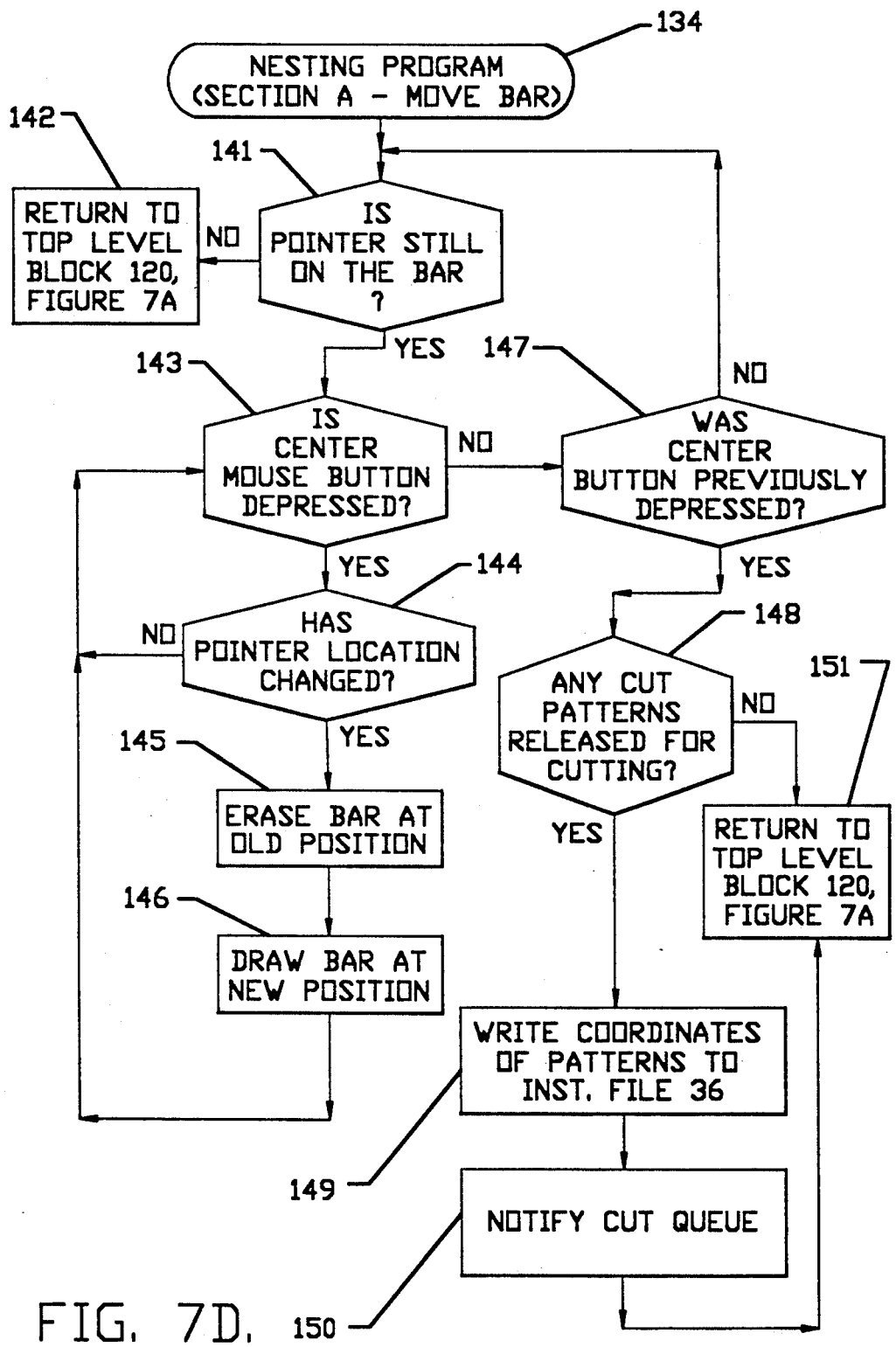
Figure 7E:
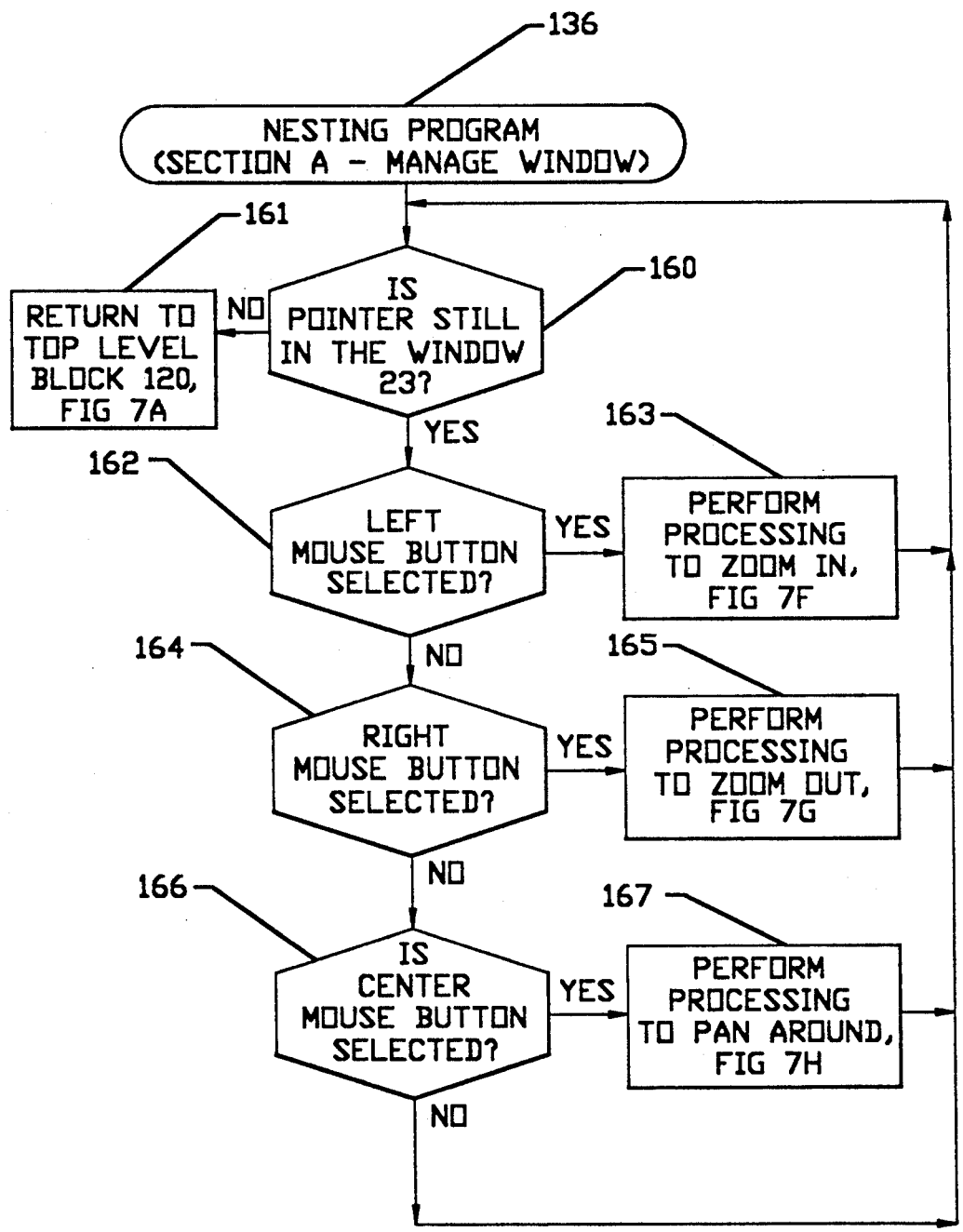

Referring now to FIG. 7D the processing to move the bar (Block 134 of FIG. 7C) will now be described. A test is first made at Block 141 as to whether the pointer is still on the bar. If not, then at Block 142 processing returns to the top level (Block 120 of FIG. 7A). If yes, then a test is made at Block 143 as to whether the center mouse button is depressed. If the center mouse button is depressed, a test is made at Block 144 as to whether the pointer location has changed. If yes, then the old position of the bar is erased at Block 145 and the bar is redrawn at the new position at Block 146.

On the other hand, if the center mouse button was depressed before Block 147, then a test is made as to whether any cut patterns were released for cutting, at Block 148. In other words, a test is made as to whether any cut patterns are completely to the right of bar 26. If yes, then the coordinates of the patterns are written into the instruction file 36, at Block 149. It will be recalled that the coordinates of each pattern were previously stored in the database 37 relative to some origin for each pattern. The absolute coordinates are determined by fixing the coordinates of each pattern's origin relative to the conveyor.

The Nesting Task 40 knows the location of the conveyor and keeps track of how much each pattern has been translated during the process of fitting the patterns to the specific piece of fabric. Of course, rotating and warping, described below, both alter the relative coordinates of the patterns, but this is all calculated during the warping and rotation operations. For example, if pattern A's origin relative to the conveyor starts out at (10.5, 6.1) and the pattern is translated −3 in the X direction and 4 in the Y direction, then pattern A's origin is now at (7.5, 10.1). Knowing the location of pattern A's origin, the absolute position of all the coordinates used to describe A, in terms of a polygon are known. The coordinates will be written in this form for use by the Cut Queue task 39. Once the coordinates are written to the Instruction File 36 the Cut Queue task 39 is notified, at Block 150, and processing returns to the top level at Block 151.

Referring now to FIG. 7E, the Nesting task operations for managing the window (Block 136 of FIG. 7C) will now be described. First, a test is made at Block 160 as to whether the pointer is still in the window 23. If not, processing returns to the top level, at Block 161. If yes, a test is made at Block 162 as to whether the left mouse button was clicked or selected. If yes, then at Block 163, the processing to zoom in (FIG. 7F) is performed. If the left mouse button was not clicked at Block 162 then a test is made at Block 164 as to whether the right mouse button was clicked. If yes, then at Block 165 the processing to zoom out of (FIG. 7G) is performed. On the other hand, if the right mouse button was not clicked then a test is made at Block 166 as to whether the center mouse has been clicked. If yes, at Block 167, the processing to pan around (FIG. 7H) is performed.

Figure 7F:
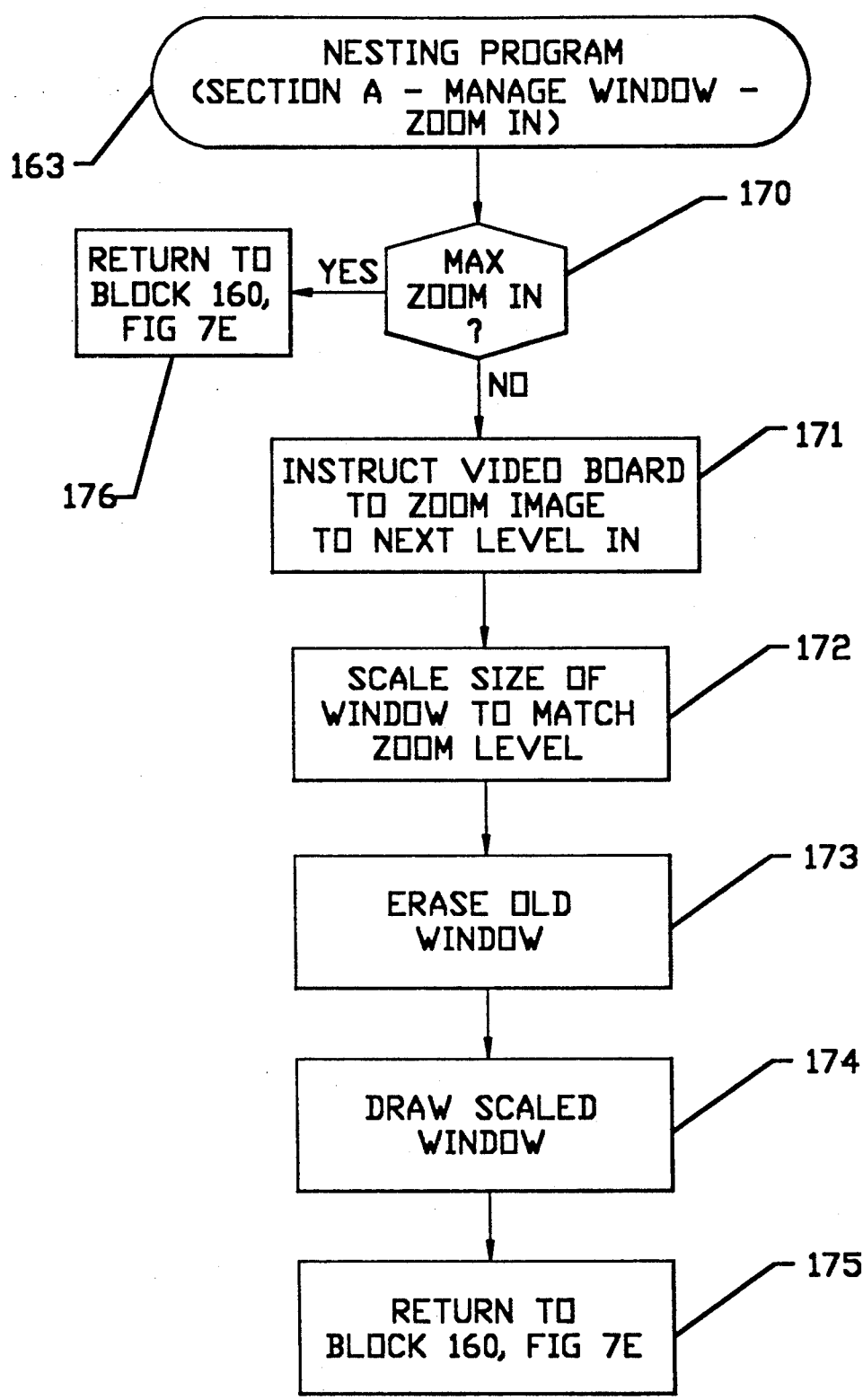

Referring now to FIG. 7F, the operations performed to zoom in (Block 163 at FIG. 7E) will now be described. First, a test is made at Block 170, as to whether the program is already at maximum zoom in. If yes, then processing returns to Block 160 of FIG. 7E at Block 176. If not, then a command is placed to the video board (18, FIG. 5) to zoom the image to the next level in. Then, at Block 172 the size of the window 23 (FIG. 4) is scaled to match the zoom level. The old window is erased at Block 173 and the scaled new window is drawn at Block 174. Processing then returns to Block 160 of FIG. 7E at Block 175.

Figure 7G:
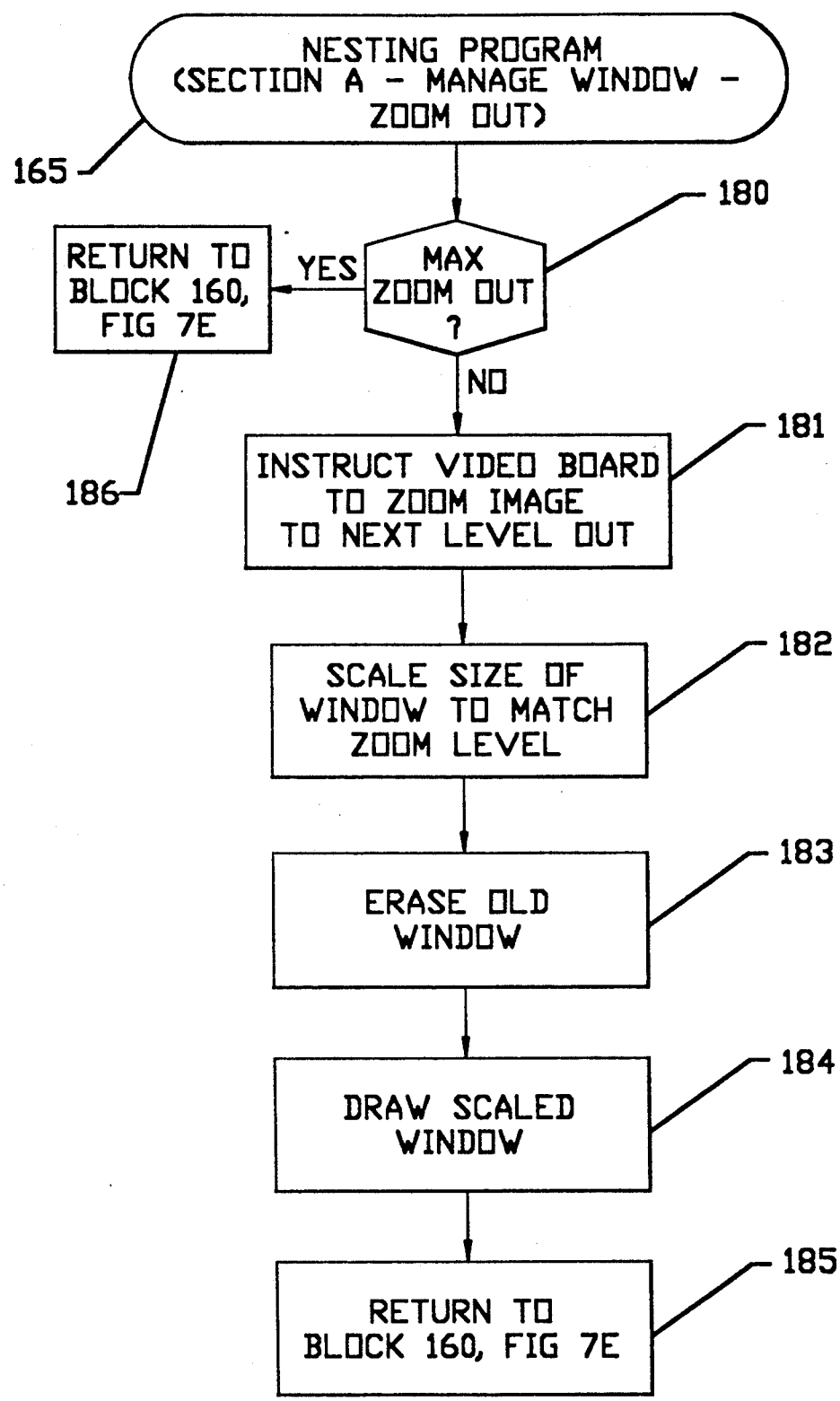

Referring now to FIG. 7G, the operations for zooming out (Block 165 of FIG. 7E) will now be described. First, at Block 180, a test is made as to whether maximum zoom out has already been obtained. If yes, processing returns to Block 160 of FIG. 7E, at Block 186. If not, then at Block 181 the video hardware is commanded to zoom the image to the next level out. At Block 182 the size of the window 23 (FIG. 4) is scaled to match the zoom. At Block 183 the old window is erased, and at Block 184 the new scaled window is drawn. Processing then returns to Block 160 of FIG. 7E.

Figure 7H:
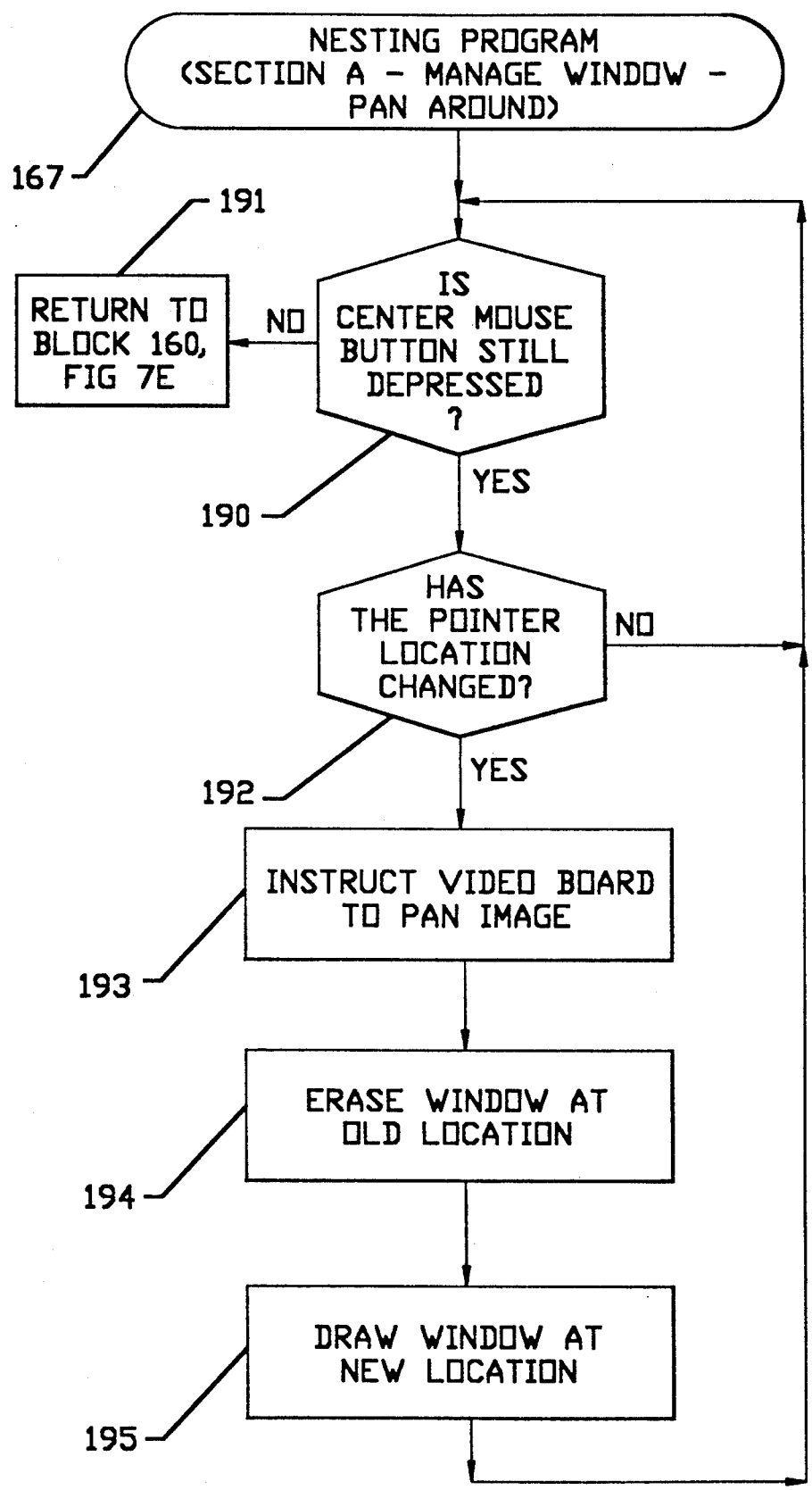

Referring now to FIG. 7H, the processing operations for panning (FIG. 7E, Block 167) will now be described. A test is first made at Block 190 as to whether the center mouse button is still depressed. If not, processing returns to Block 160 of FIG. 7E, at Block 191. A test is then made at Block 192 as to whether the pointer location has changed. If yes, then the video board 18 is instructed to pan the image by the change in the pointer location, at Block 193. The window at the old location is erased at Block 194 and a new window at the new location is drawn at Block 195.

Figure 7I:
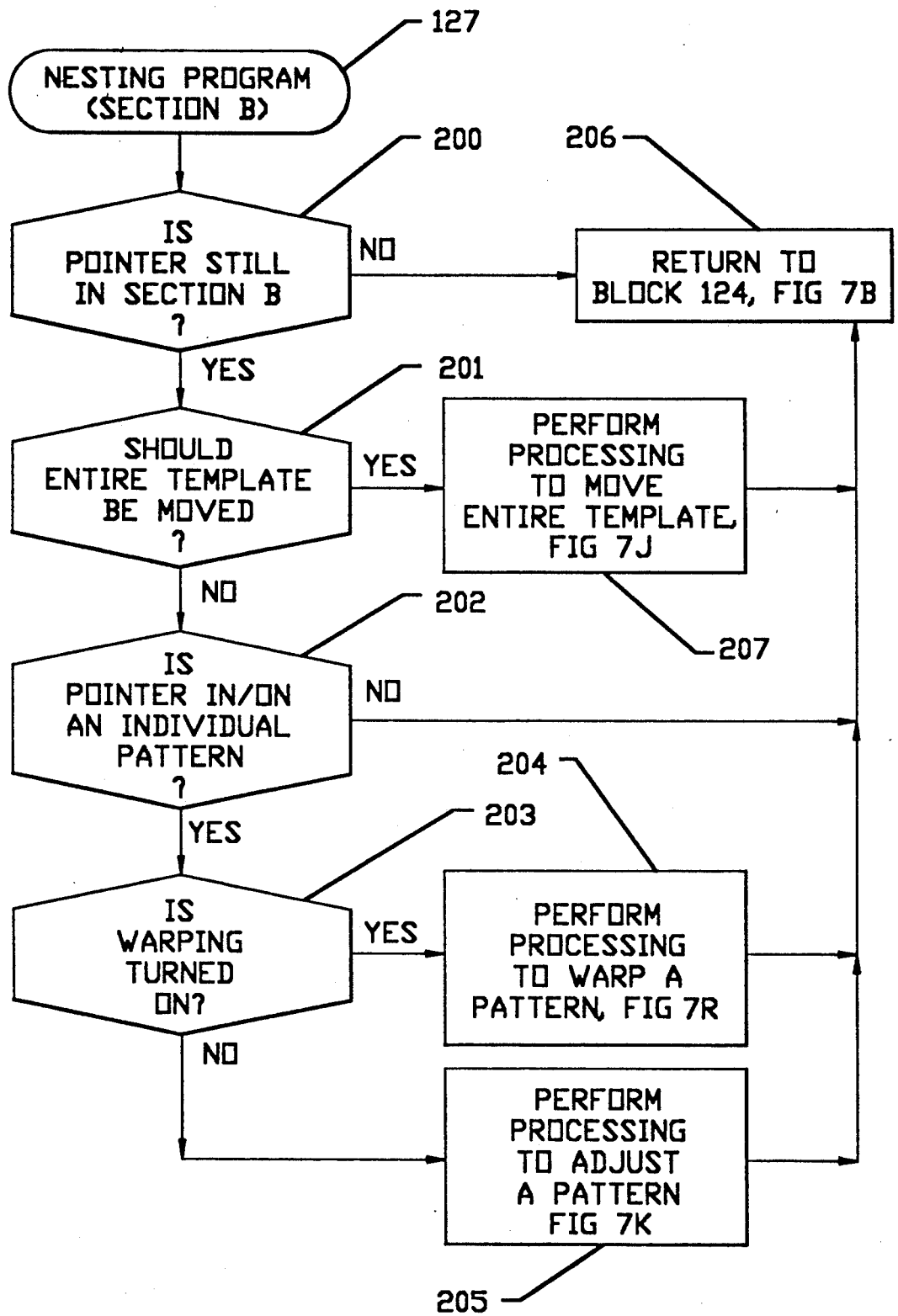
Figure 7J:
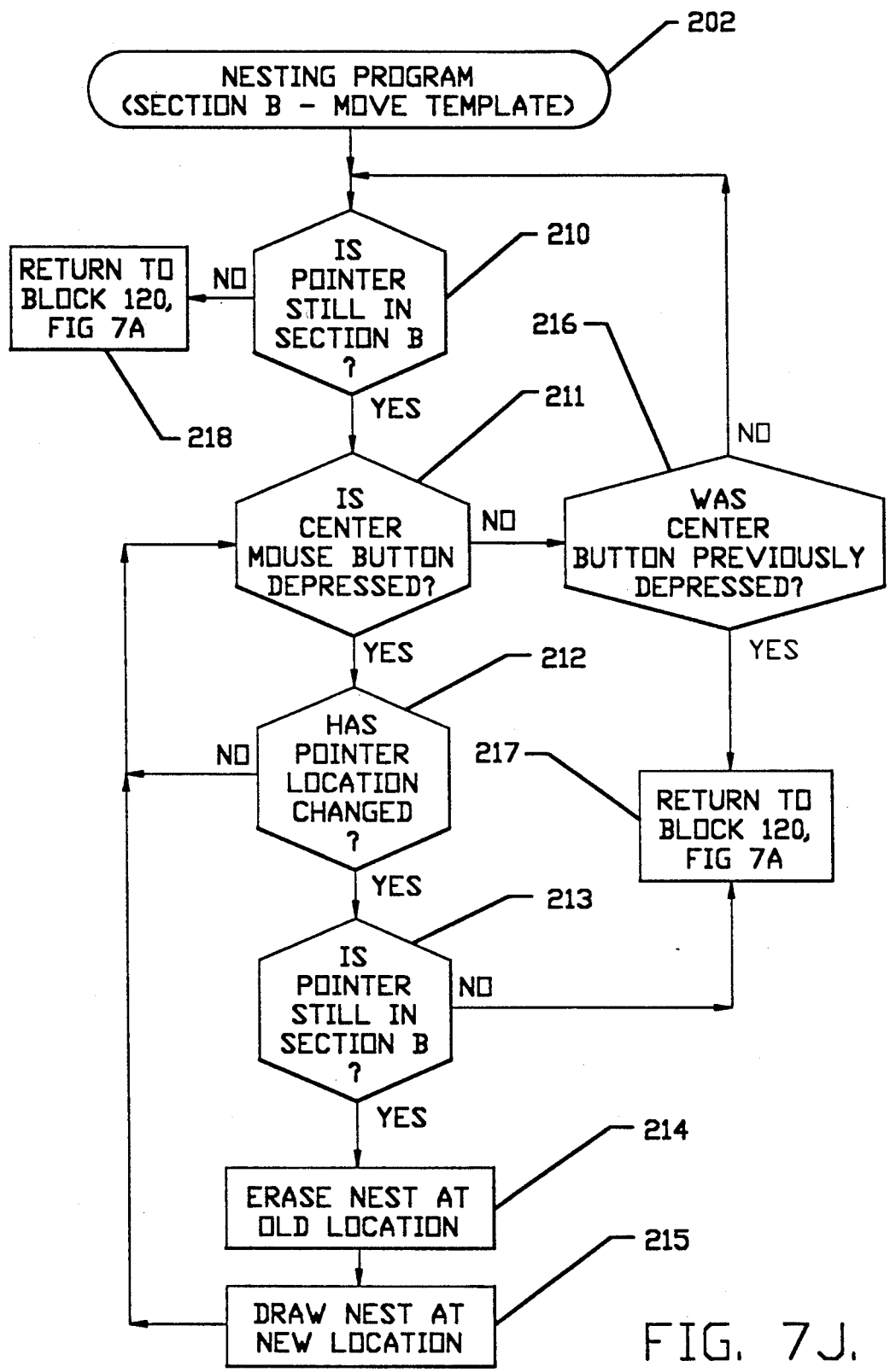

Referring now to FIG. 7I, the processing for the nesting program for Section B of the graphic screen of FIG. 4 (Block 127 of FIG. 7B) will now be described. At Block 200 a test is made as to whether the pointer is still in Section B. If not, then processing returns to Block 124 of FIG. 7B, at Block 206. If yes, a test is made as to whether the entire template should be moved, at Block 201. If yes, then at Block 202 the processing to move an entire template, described in FIG. 7J, is performed. If the entire template is not to be moved, then a test is made, at Block 202, as to whether the pointer is in or on an individual pattern. If yes, then test is made at Block 203 as to whether warping is turned on. If warping is on, then at Block 204 the processing to warp a pattern (FIG. 7R) is performed. On the other hand, if warping is not turned on at Block 203 then at Block 205, the processing to adjust an individual pattern (FIG. 7K) is performed.

Referring now to FIG. 7J, the processing performed to move a template (Block 202 of FIG. 7I) will now be described. A test is first made at Block 210 as to whether the pointer is still in Section B. If not, processing returns to Block 120 of FIG. 7A at Block 216. On the other hand, if the pointer is still in Section B, then a test is made at Block 211 as to whether the center mouse button was depressed or selected. If the center mouse button was depressed then a test is made at Block 212 as to whether the pointer location has changed. If the pointer location has changed and the pointer is still in Section B (Block 213) then the nest at the old location is erased at Block 214 and the nest at the new location is drawn at Block 215. On the other hand, if the center mouse button was not depressed (Block 211) and the center mouse was previously depressed (Block 216), then processing returns to Block 120 of FIG. 7A, at Block 217.

Figure 7K:
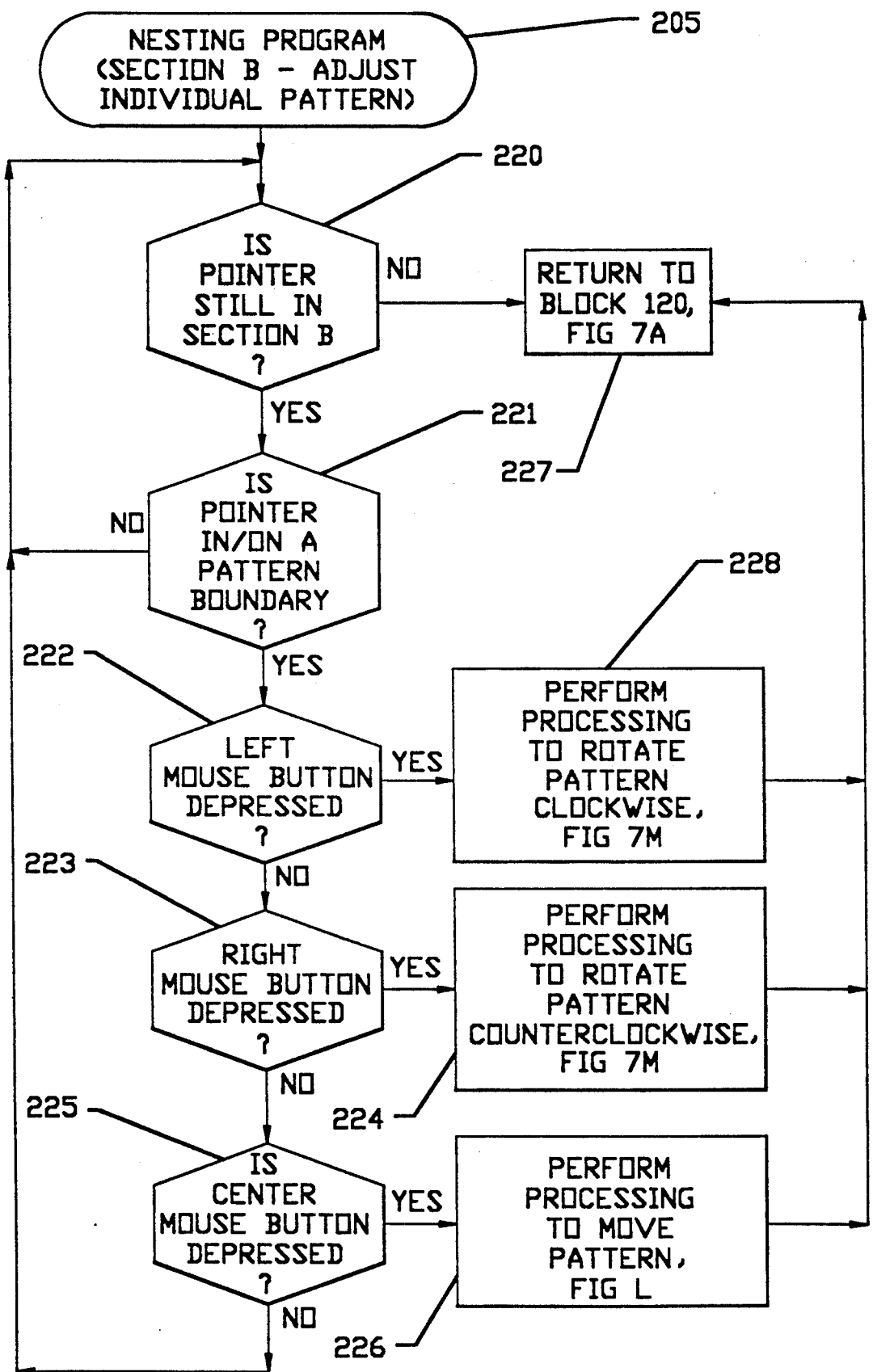

Referring now to FIG. 7K, the processing performed to adjust an individual pattern (Block 205 of FIG. 7I) will now be described. At Block 220 a test is made as to whether the pointer is still in Section B. If not, processing returns to Block 120 of FIG. 7A at Block 227. If yes, a test is made at Block 221 as to whether the pointer is in or on a pattern boundary. If yes, a test is made as to whether the left mouse button is selected at Block 222, and if yes, the processing to rotate a pattern clockwise is performed at Block 228. On the other hand, if the right mouse button was clicked (Block 223) then the processing to rotate the pattern counterclockwise is performed (Block 224). If the center mouse button was depressed (Block 225) then the process to move the pattern (FIG. 7L) is performed, at Block 226.

Figure 7L:
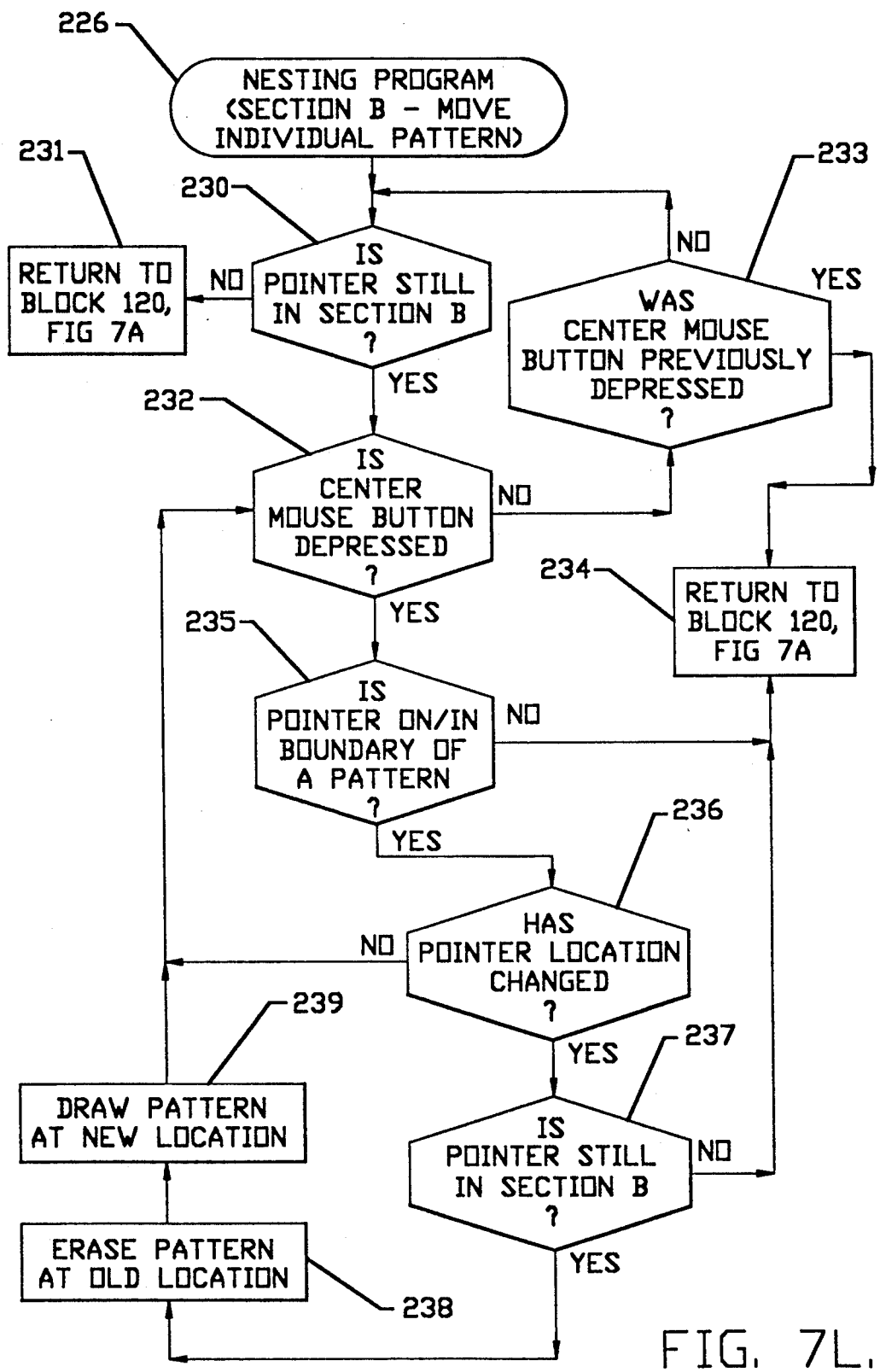

Referring now to FIG. 7L, the processing to move an individual pattern (Block 226 of FIG. 7K) will now be described. First, at Block 230, a test is made as to whether the pointer is still in Section B, and if not processing returns to Block 120 of FIG. 7A (Block 231). If the pointer is still in Section B, a test is made at Block 232 as to whether the center mouse button was depressed. If not and the center mouse was previously depressed (Block 233), then processing returns to Block 232 of FIG. 7A at Block 234. On the other hand, if the center mouse button was depressed, a test is made at Block 235 as to whether the pointer is on or in the boundary of the pattern. If yes, a test is made at Block 236 as to whether the pointer location has changed. If the pointer location has changed, a test is made at Block 237 as to whether the pointer is still in Section B. If the pointer is still in Section B then the old pattern is erased at Block 238 and a new pattern is drawn at Block 239.

Figure 7M:
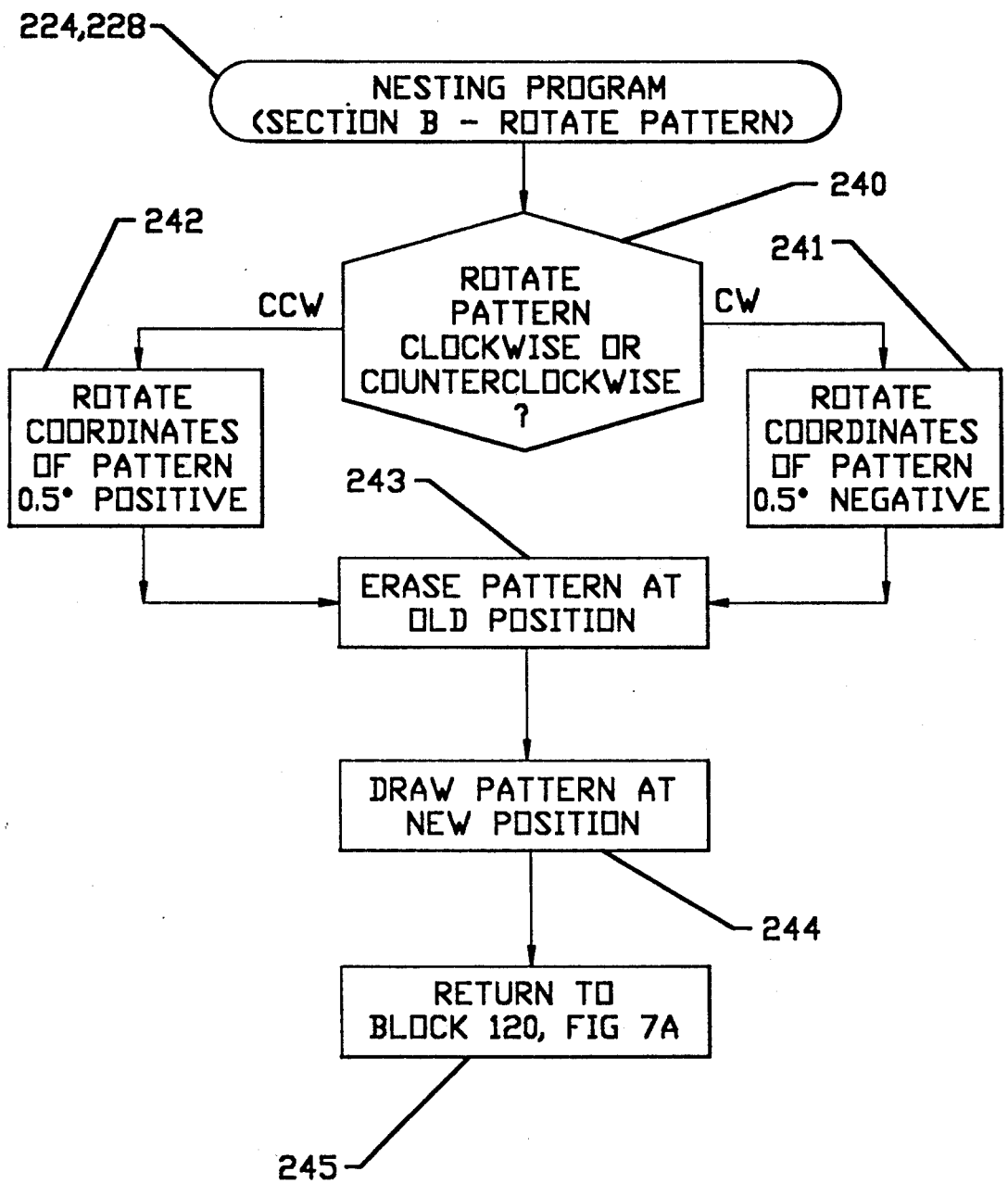

Referring now to FIG. 7M, the processing to rotate the pattern (Blocks 224 and 228 of FIG. 7K) will now be described. At Block 240 a test is made as to whether the pattern is rotated clockwise (Block 228 of FIG. 7K) or counterclockwise (Block 224 of FIG. 7K). If clockwise, then the coordinates of the pattern are rotated half of a degree negative at Block 241. On the other hand, if counterclockwise, the coordinates of the pattern are rotated a half a degree positive at Block 242. Then, at Block 243, the pattern at the old position is erased and at Block 244 the new pattern at the new position is drawn. Processing then returns to Block 120, FIG. 7A (Block 245).

Figure 7N:
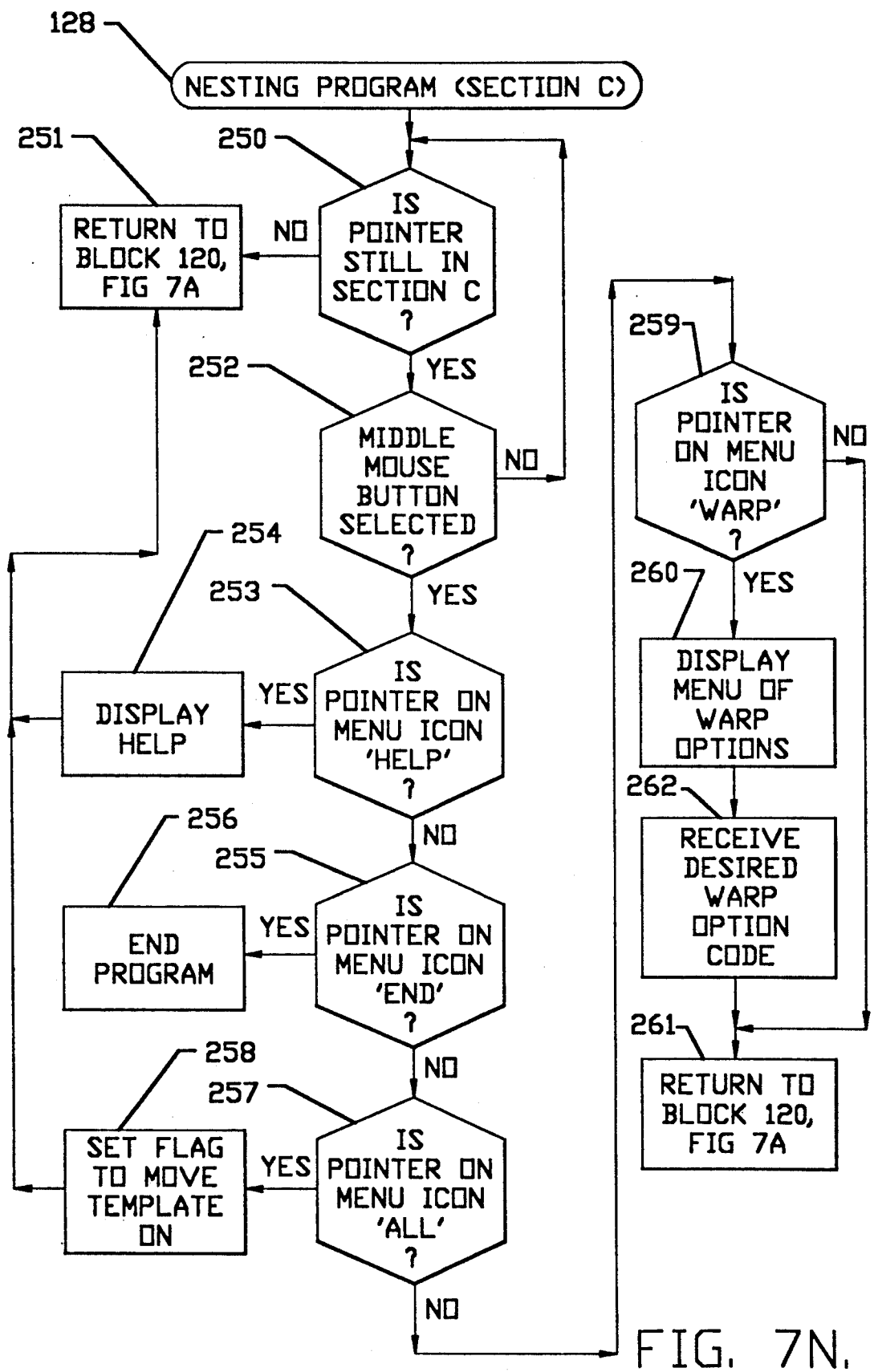

Referring now to FIG. 7N, the processing of icons on Section C (FIG. 7B, Block 128) will now be described. A test is first made at Block 250 as to whether the pointer is still in Section C and if not processing returns to Block 120 of FIG. 7A (Block 251). If the pointer is still in Section C a test is made at Block 252 as to whether the middle mouse button was selected. If yes, a test is made at Block 253 as to whether the pointer was on the "HELP" icon, and if yes then an appropriate help message is displayed at Block 254. On the other hand if not, a test is made at Block 255 as to whether the pointer is on the "END" icon. If yes, then at Block 256 the program is ended. If not, then at Block 257 a test is made as to whether the pointer is on the "ALL" icon. If yes, then a flag is set at Block 258 to move the template on. If not a test is made at Block 259 as to whether the pointer is on the "WARP" icon and if yes at Block 260 a pop up menu of warp options is displayed. The operator selected warp option code is selected at Block 262, and saved. Processing then returns to Block 120 of FIG. 7A at Block 261.

Figure 7O:
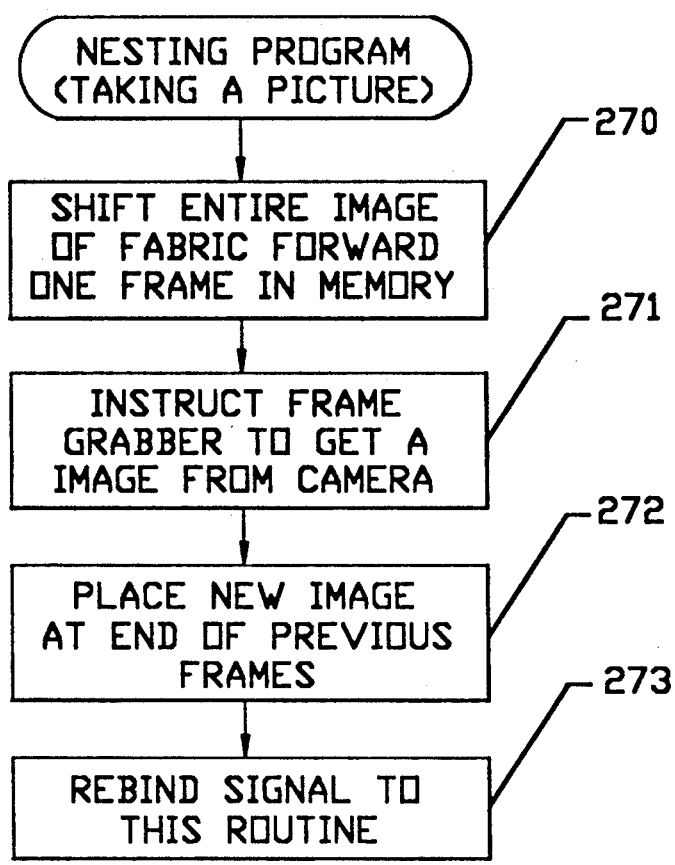

Referring now to FIG. 7O the operations for taking a picture will now be described. The taking a picture routine is executed asynchronously with respect to the main nesting program (FIG. 7A-7N). It is executed upon the receipt of a signal from the Cut Queue task 39. Referring to Block 270, the entire image of the fabric is shifted forward one frame in memory. Then, an instruction is provided at Block 271 to the frame grabber 19 to get a new picture from the camera 3. The new image is placed at the end of the previous frames in the video memory 18 at Block 272. At Block 273 the signal is rebinded to this routine. "Signal binding" causes the bound routine to be executed upon receipt of the signal. The binding is only valid upon receipt of one signal, however, and must be "rebound" if the routine will be used to handle the signal after receipt of one signal.

Figure 7P:
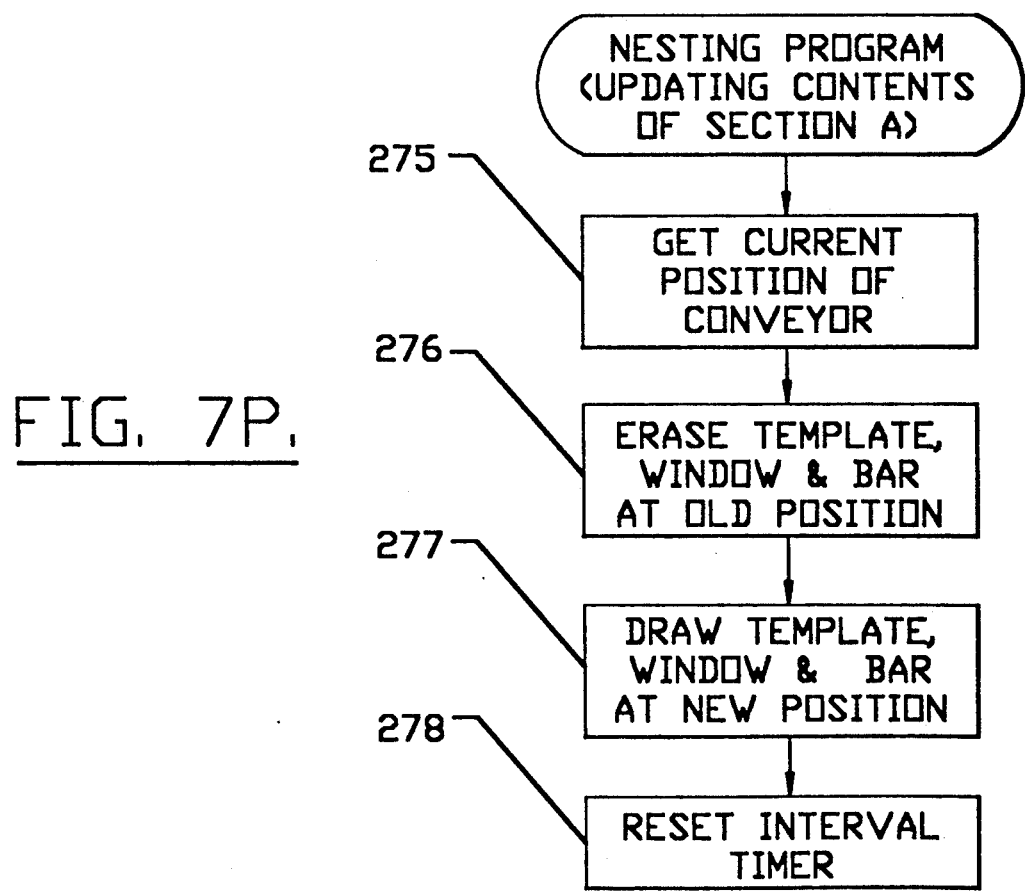

Referring to FIG. 7P, the process for updating the contents of Section A will now be described. This process is executed asynchronously with respect to the main nesting program (FIG. 7A-7N). It is executed upon expiration of an interval timer of, for example a quarter of a second. Referring to Block 275, the current position of the conveyor 11 is obtained, and at Block 276 the template, window, and bar (21, 23, and 26 respectively of FIG. 4), are erased. At Block 277 a template, window, and bar at the new position are drawn and the interval timer is reset at Block 278.

Figure 7Q:
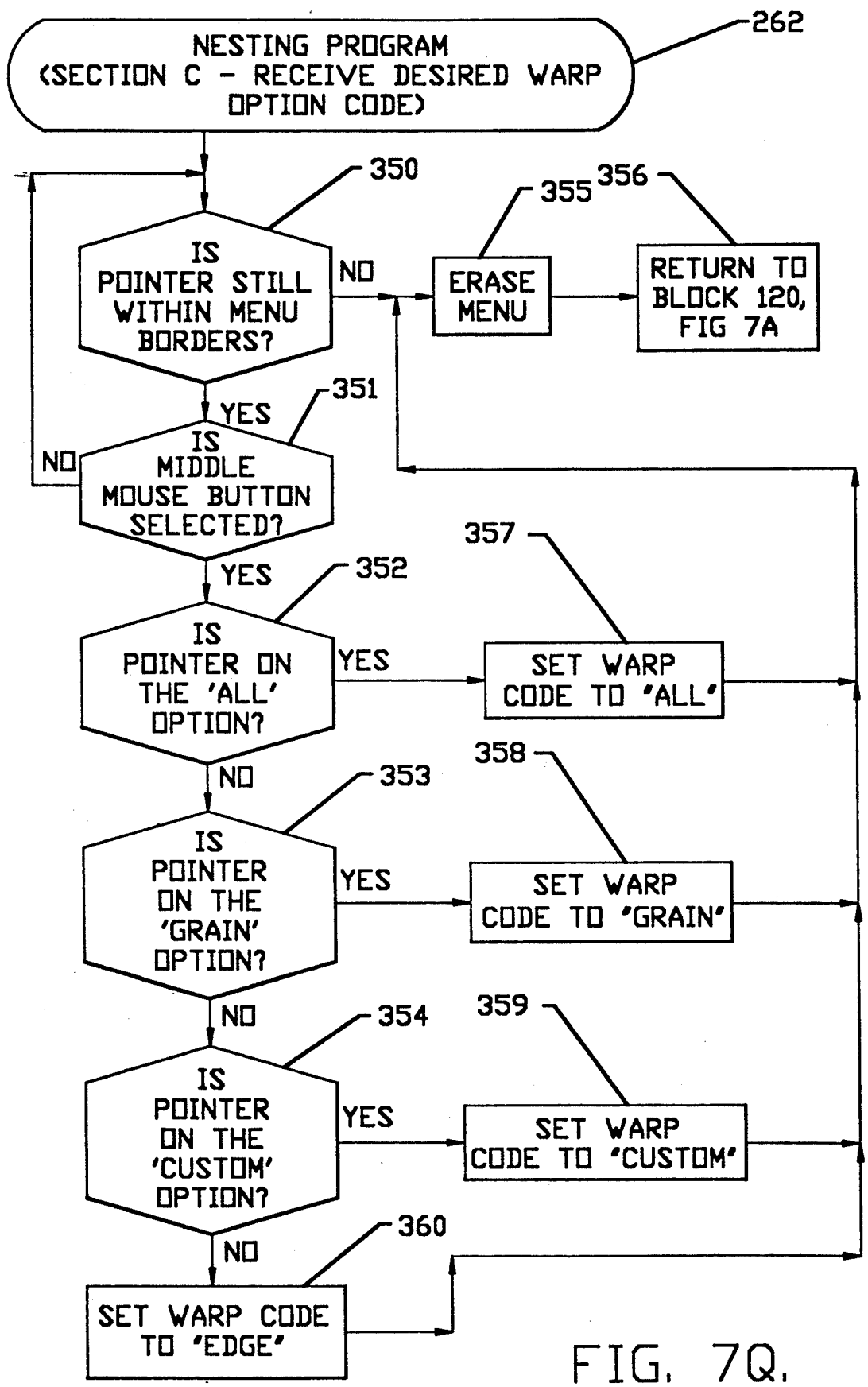

Referring now to FIG. 7Q, the detailed operations for receiving the desired warp option code (Block 262 of FIG. 7N), will now be described. A test is first made at Block 350, as to whether the pointer is still within the menu border. It will be understood that a pop-up menu is preferably used. If the pointer is not within the pop-up menu border, then at Block 355 the menu is erased and at Block 356 processing returns to Block 120 of FIG. 7A.

On the other and, if the pointer is still within the menu borders a test is made as to whether the middle mouse button is selected at Block 351. If yes, a test is made at Block 352 as to whether the pointer is on the 'ALL' option, and if it is the warping option code is set to 'ALL' at Block 357. On the other hand, if the pointer is not on the 'ALL' option a test is made as to whether the pointer is on the 'GRAIN' option, at Block 353, and if yes, the warping code is set to 'GRAIN' at Block 358. If the pointer is not on the 'GRAIN' option, then at Block 354 a test is made as to whether the pointer in on the 'CUSTOM' option, and at Block 359 the warping code is set to 'CUSTOM'. If the pointer is not on the 'CUSTOM' option it is assumed to be on the 'EDGE' option, and at Block 360 the warp code is set to 'EDGE'.

Figure 7R:
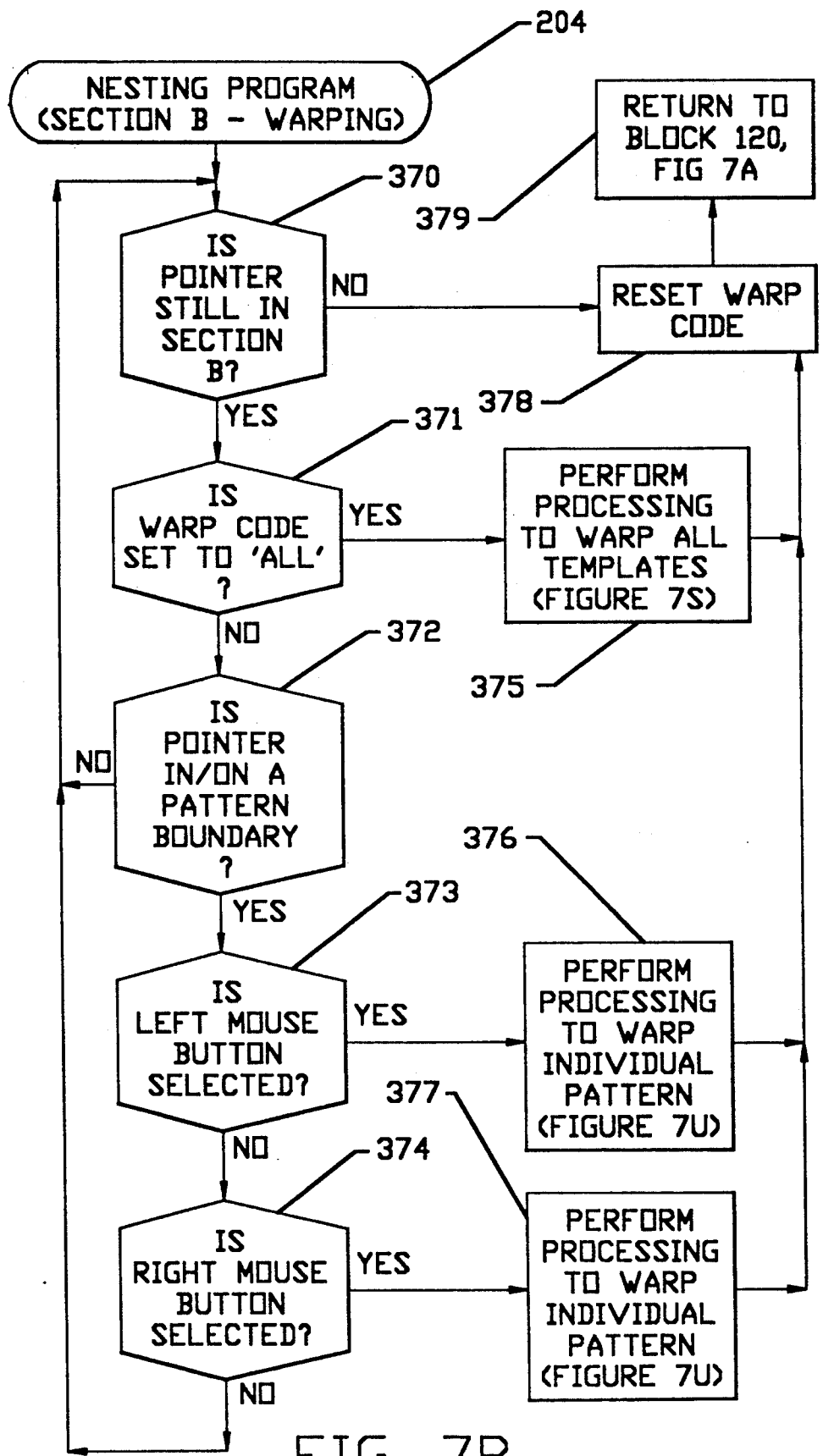

Referring now to FIG. 7R, the operation of the nesting program to provide the warping function (Block 204 of FIG. 7I) will now be described. At Block 370, a test is made to determine whether the pointer is still in Section B. If not, the warp code is reset at Block 378 and processing returns to Block 120 of FIG. 7A at Block 379. On the other hand, if the pointer is still in Section B, a test is made at Block 371 as to whether the warp flag is set to 'ALL'. If yes, then at Block 375 the processing to warp all of the templates (FIG. 7S) is performed. On the other hand, if the pointer is in or on a pattern boundary (Block 372) and the left mouse button is selected (Block 373) then at Block 376 the processing to warp an individual pattern (FIG. 7V) is performed. Finally, a test is made at Block 374 if the right mouse button is selected, and if yes, then the processing to warp an individual pattern (FIG. 7U) is performed at Block 377.

Figure 7S:
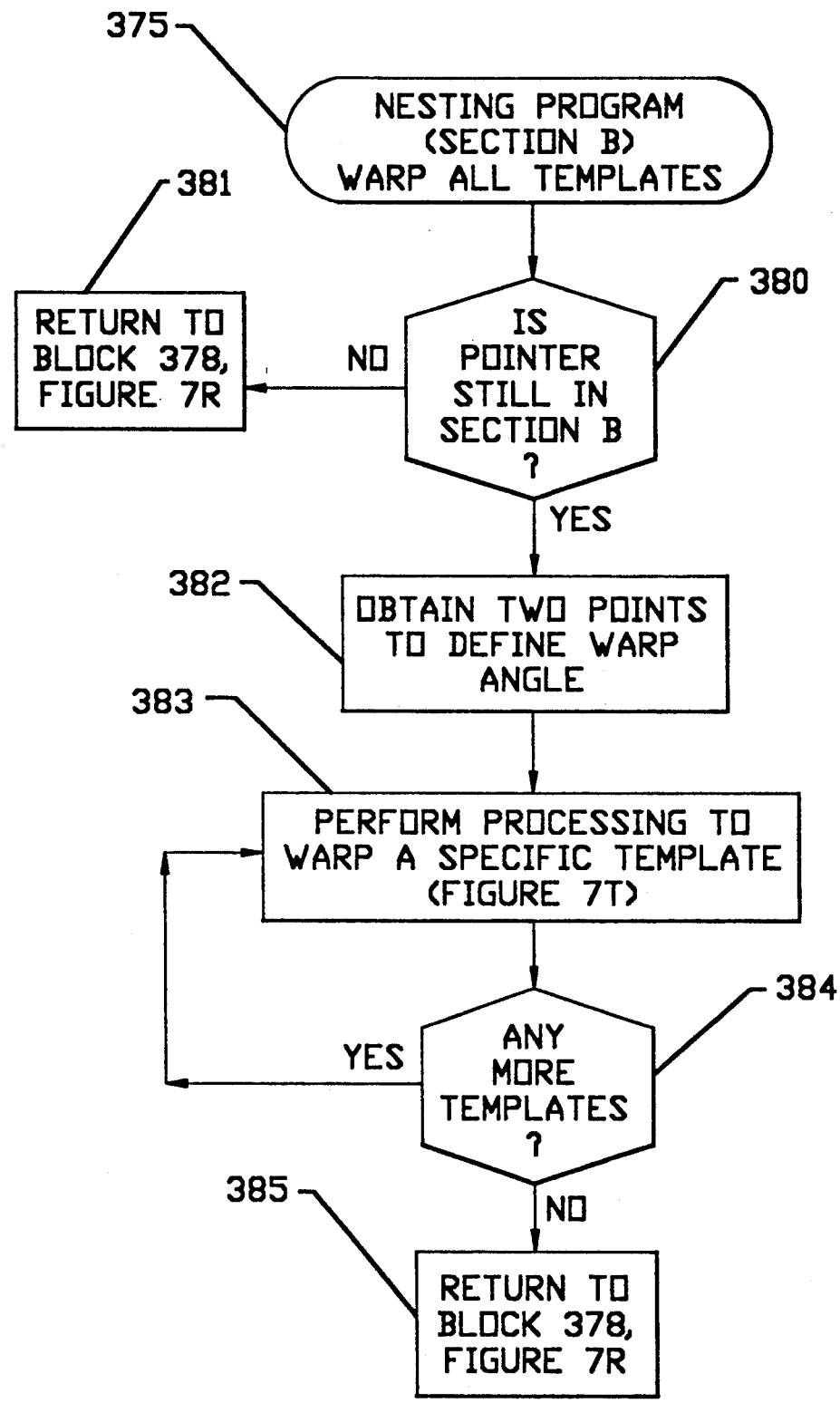

Referring now to FIG. 7S, the detailed operations for warping all templates (Block 375 of FIG. 7R) will now be described. First, a test is made at Block 380 as to whether the pointer is still in Section B, and if not, processing returns to Block 378 of FIG. 7R at Block 381. If the pointer still is in Section B, then at Block 382 two points are obtained from the user in order to define the warp angle at Block 382. The processing to warp a specific templates (FIG. 7T) is then performed at Block 383. After performing this processing, a test is made at Block 384 as to whether any more patterns are to be warped. If not, at Block 385 processing returns to Block 378 of FIG. 7R.

Figure 7T:
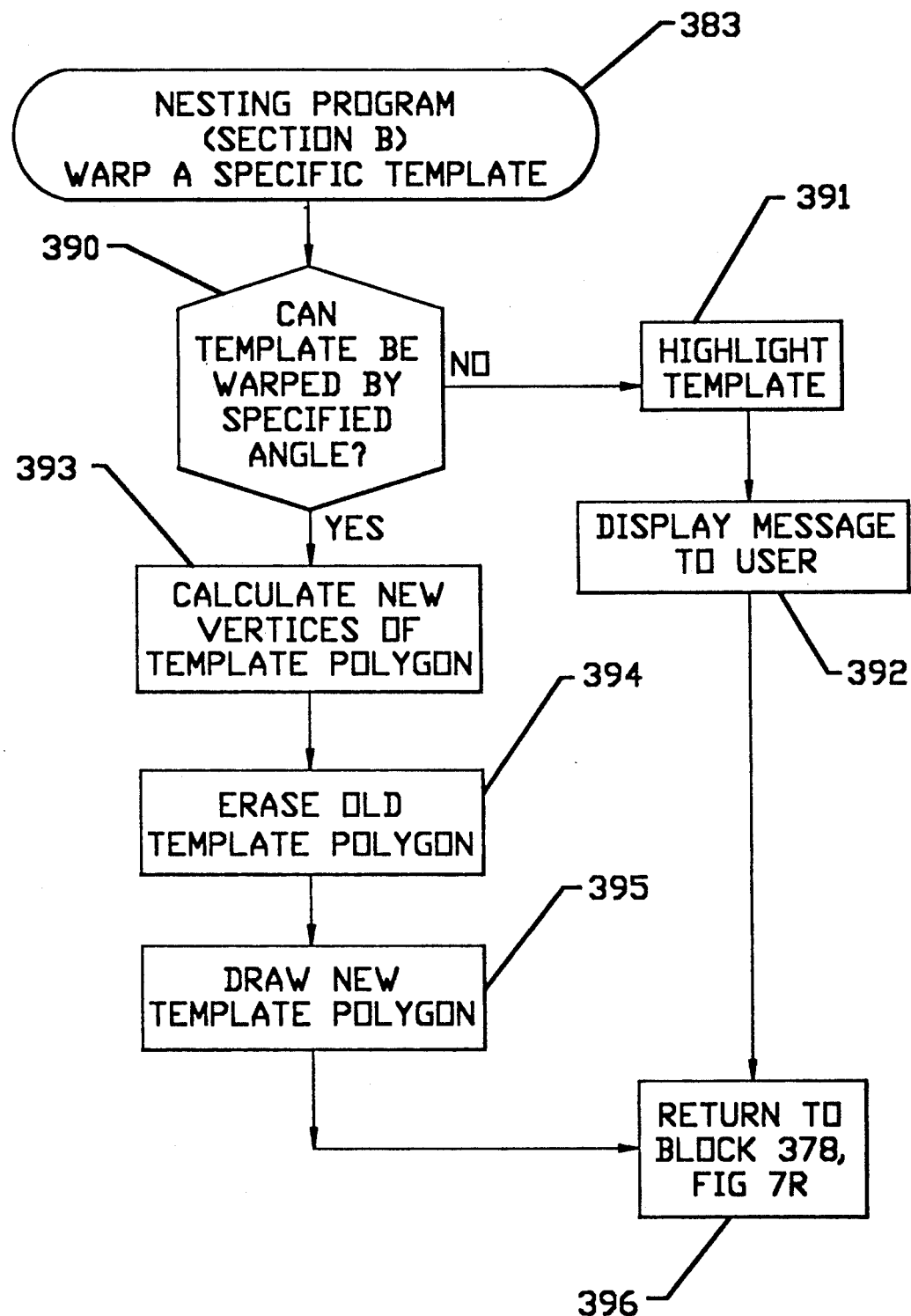
Figure 7U:
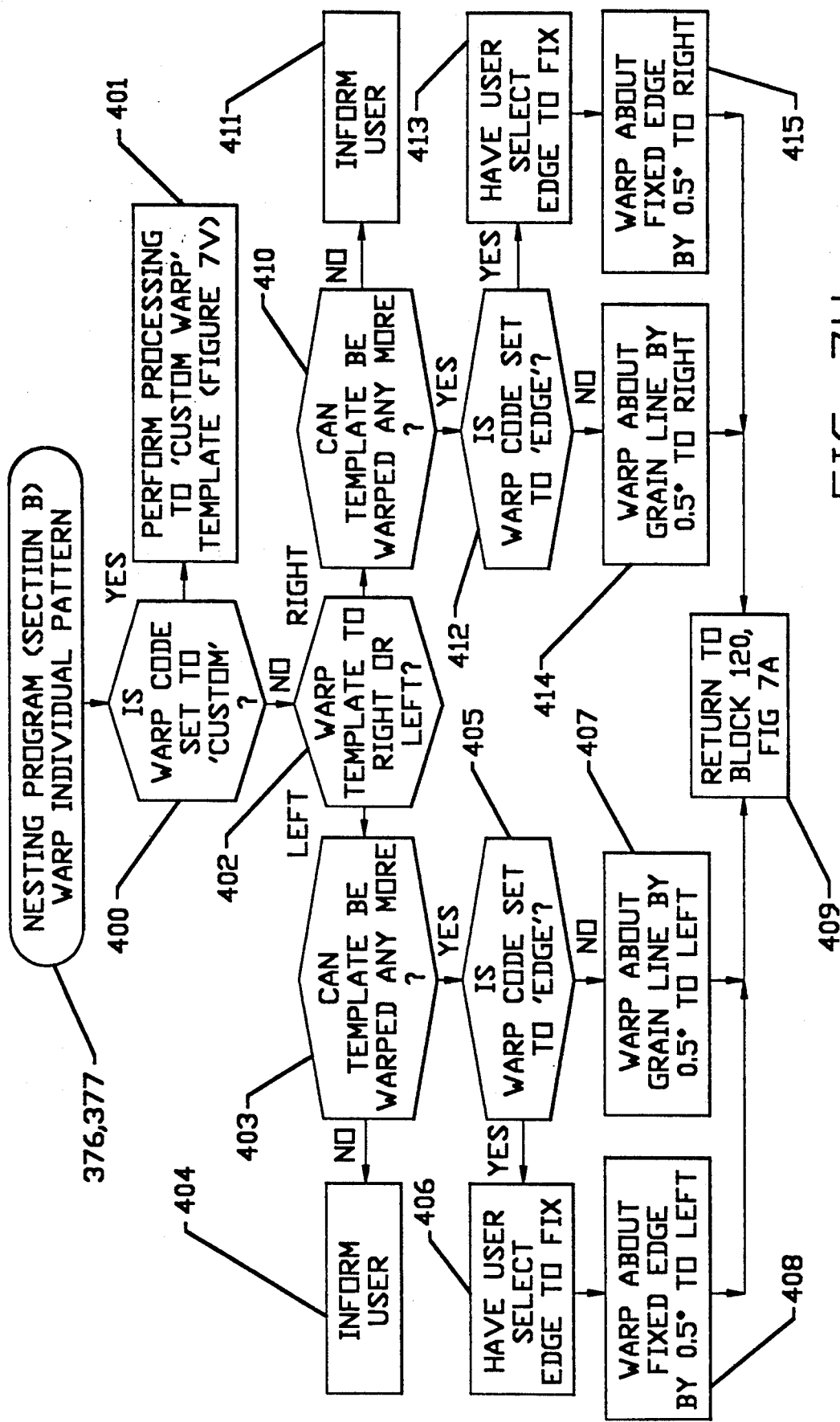
Figure 7V:
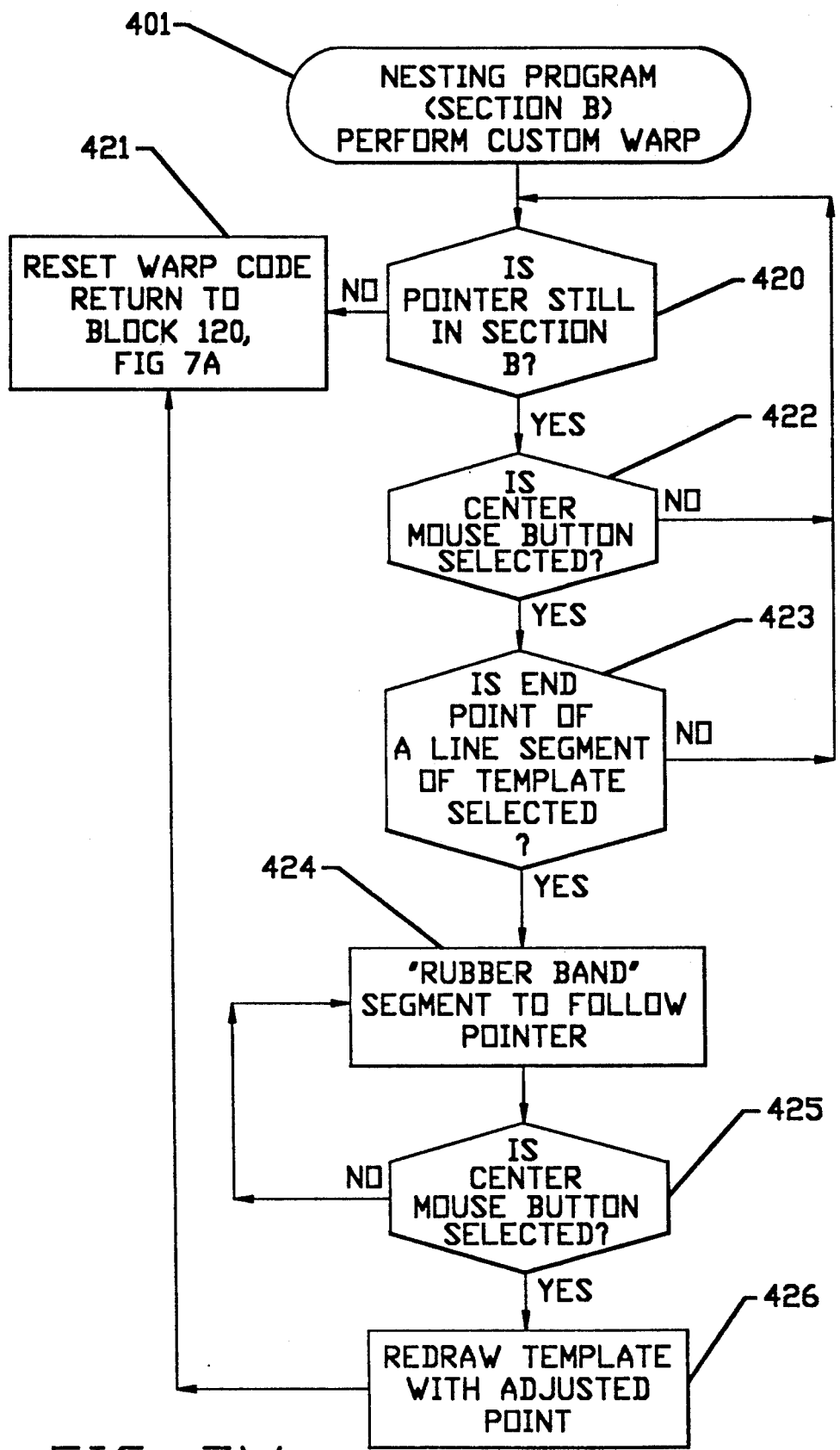

Referring now to FIG. 7T, the processing to warp a specific template by an angle about the grain marker (Block 383 of FIG. 7S) will now be described. First, at Block 390 a test is made as to whether the pattern can be warped by the specified angle. If not, then at Block 391 the template which cannot be warped is highlighted, for example by turning the template red or blinking the template. A message is displayed to the user at Block 392 and processing returns to Block 378 of FIG. 7R at Block 396. On the other hand if the pattern can be warped by the specified angle then at Block 393 the new vertices of the polygon are calculated, the old polygon is erased at Block 394 and a new polygon is drawn at Block 395 to correspond to the warped template.

Referring now to FIG. U, the detailed operations for warping an individual pattern (Blocks 376 and 377) of FIG. 7R will now be described. First, a test is made at Block 400 as to whether the warp code is still set to 'CUSTOM'. If yes, then the processing to 'CUSTOM' warp a pattern (FIG. 7V) is performed at Block 401. On the other hand, if a 'CUSTOM' warp is not to be performed, then a test is made at Block 402 as to whether the pattern is to be warped to the right or to the left.

Processing is symmetrical for left and right warping except that the actual warping is made to the left or to the right. Accordingly, these processing blocks will be described together. First, a test is made (Blocks 403 and 410) as to whether the template can be warped any more. If not, then the user is so informed at Blocks 404 and 411. If they can be warped, then a test is made at Blocks 405 and 412 as to whether the warp code is set to 'EDGE'. If it is set to 'EDGE' then the user is informed to select the edge to fix at Blocks 406 and 413. Then when the 'EDGE' is selected a warp is performed about the selected 'EDGE' by 0.5° to the left (Block 408) or 0.5° to the right (Block 414). On the other hand, if the warp code is not set to 'EDGE' then the template is warped about its 'GRAIN' line by 0.5° to the left (Block 407) or 0.5° to the right (Block 414). Processing then returns to Block 120 of FIG. 7A. Finally, referring to FIG. 7V the processing to perform a 'CUSTOM' warp (Block 401 of FIG. 7U) will now be described. First, at Block 420, a test is made as to whether the pointer is still in Section B, and if not the warp code is reset and processing returns to Block 120 of FIG. 7A at Block 421. On the other hand, if the pointer is still in Section B, a test is made as to whether the center mouse button is selected at Block 422. If yes, then a test is made at Block 423 as to whether the end point of a line segment of a template was selected and if yes, processing is performed at Block 424 to "rubber band" the segment to follow the pointer. Accordingly, a 'CUSTOM' warp is provided. When the center mouse button is selected at Block 425, it is assumed that the 'CUSTOM' warping is over and the template is redrawn with the adjusted point at Block 426.

DETAILED OPERATION

Cut Queue 39

Referring now to FIG. 8 the detailed operation of the Cut Queue task 39 will now be described. As described previously, the Cut Queue task operates upon release of a group of templates by the operator after nesting, for example by moving the bar 26 (FIG. 4) in section A of the display screen to the left. The Cut Queue program maintains a queue or list of parts to be cut and converts the parts to a set of cutting instructions for the laser cutter 8 (FIGS. 1 and 2). These instructions then are provided to the CNC controller for controlling the laser. In particular, the cut instructions are compiled to convert these instructions from stationary conveyor to moving conveyor instructions. Also as described above, conveyor stops are controlled in order to allow the Nesting task 40 to take a picture of the fabric using camera 3.

Figure 8A:
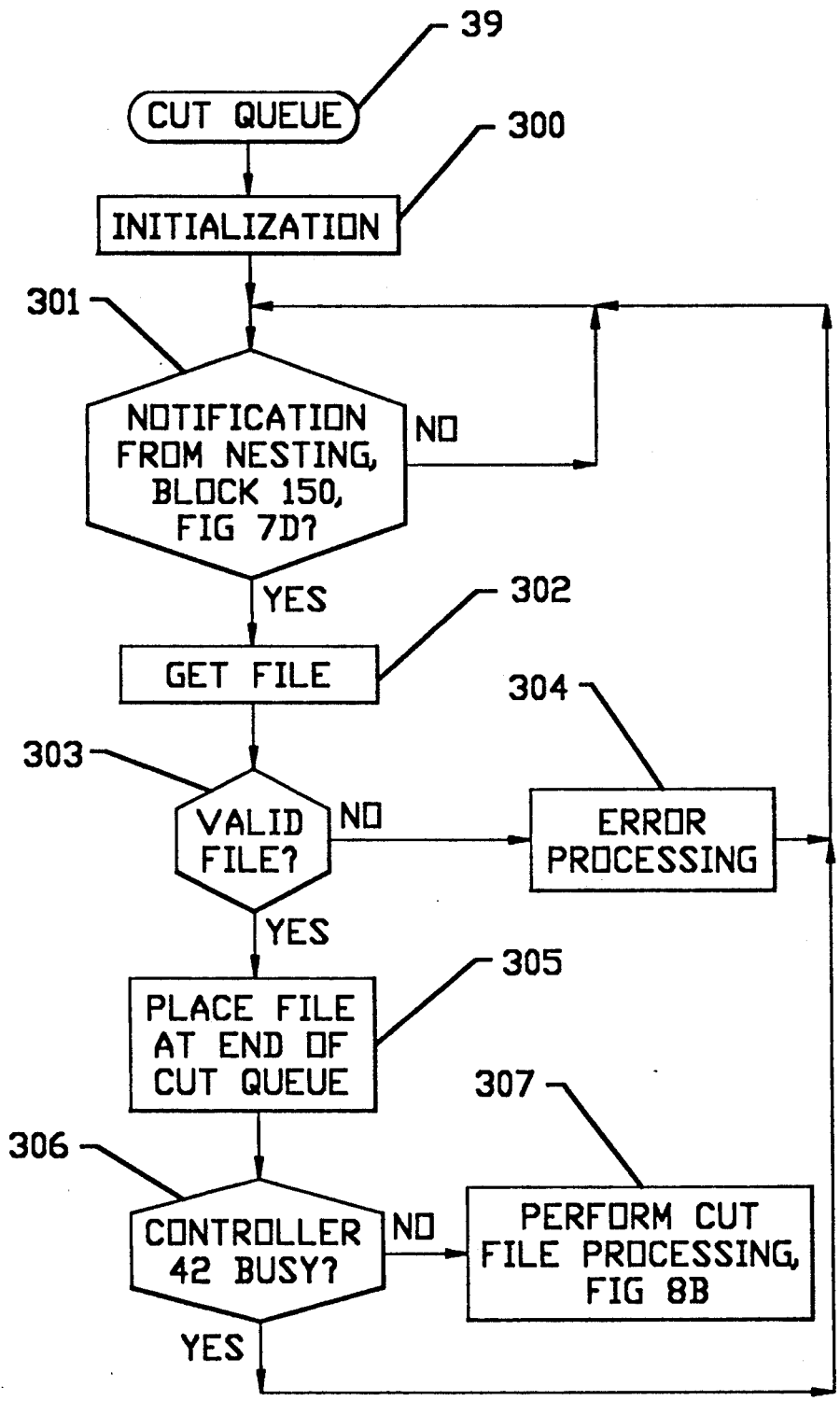
Figure 8B:
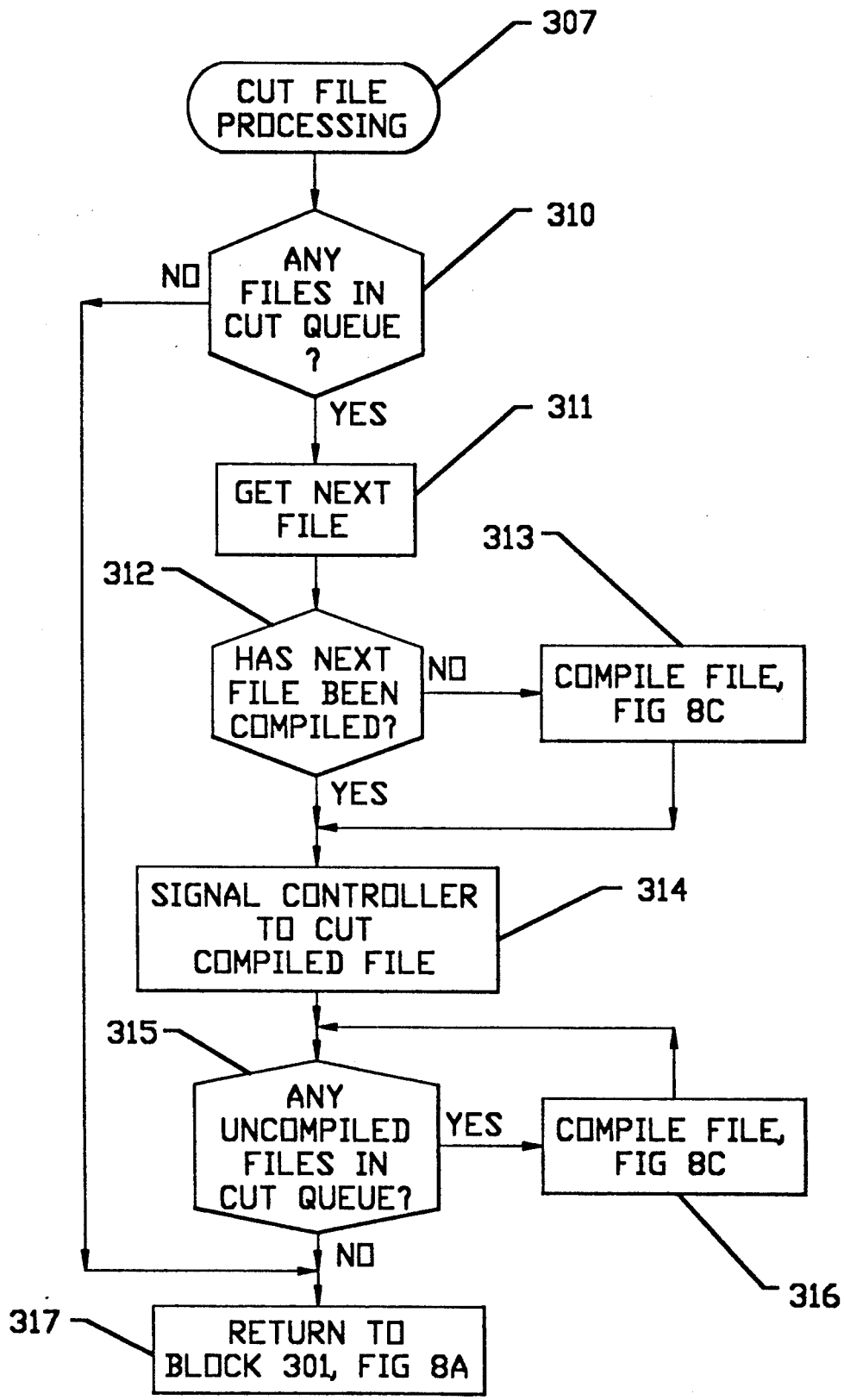

Referring now to FIG. 8A the cut queue task is first initialized at Block 300, for example, by obtaining the UNIX shared memory areas which are necessary for the task, reading the necessary control files and setting up the internal data structures and signal handling routines necessary for the Cut Queue program to operate. Processing then waits, at Block 301, until notification from nesting (Block 150 of FIG. 7D) that the operator has released one or more cut patterns for cutting. Once the one or more cut patterns has been released for cutting, this file of cut patterns is obtained, at Block 302, from the Nesting task. A test is made at Block 303 as to whether the file is valid. If not, at Block 304 error processing is performed, for example to set an error flag, send an error message or do other routine error processing. On the other hand, if the file is valid, it is placed at the end of a Cut Queue at Block 305 so that it can advance towards the beginning of the queue for cutting by the cutting station. A test is then made at Block 306 as to whether the controller 42 is busy. If not, then at Block 307 the cut file processing described in FIG. 8B is performed. If yes, then the cut file is merely stored in the Cut Queue and processing waits for the next cut file.

Referring now to FIG. 8B, the processing of a cut file (Block 307 of FIG. 8A) will now be described. As stated above, this cut file processing is initiated by the Cut Queue module task 39 when a file is added to the queue and the controller is not busy, as shown in Block 307 of FIG. 8A. This may occur, for example, when the first group of parts is released. The cut file processing may also be initiated when the controller 42 (FIG. 5) indicates that it is ready to start cutting a next group of released parts.

Figure 8C:
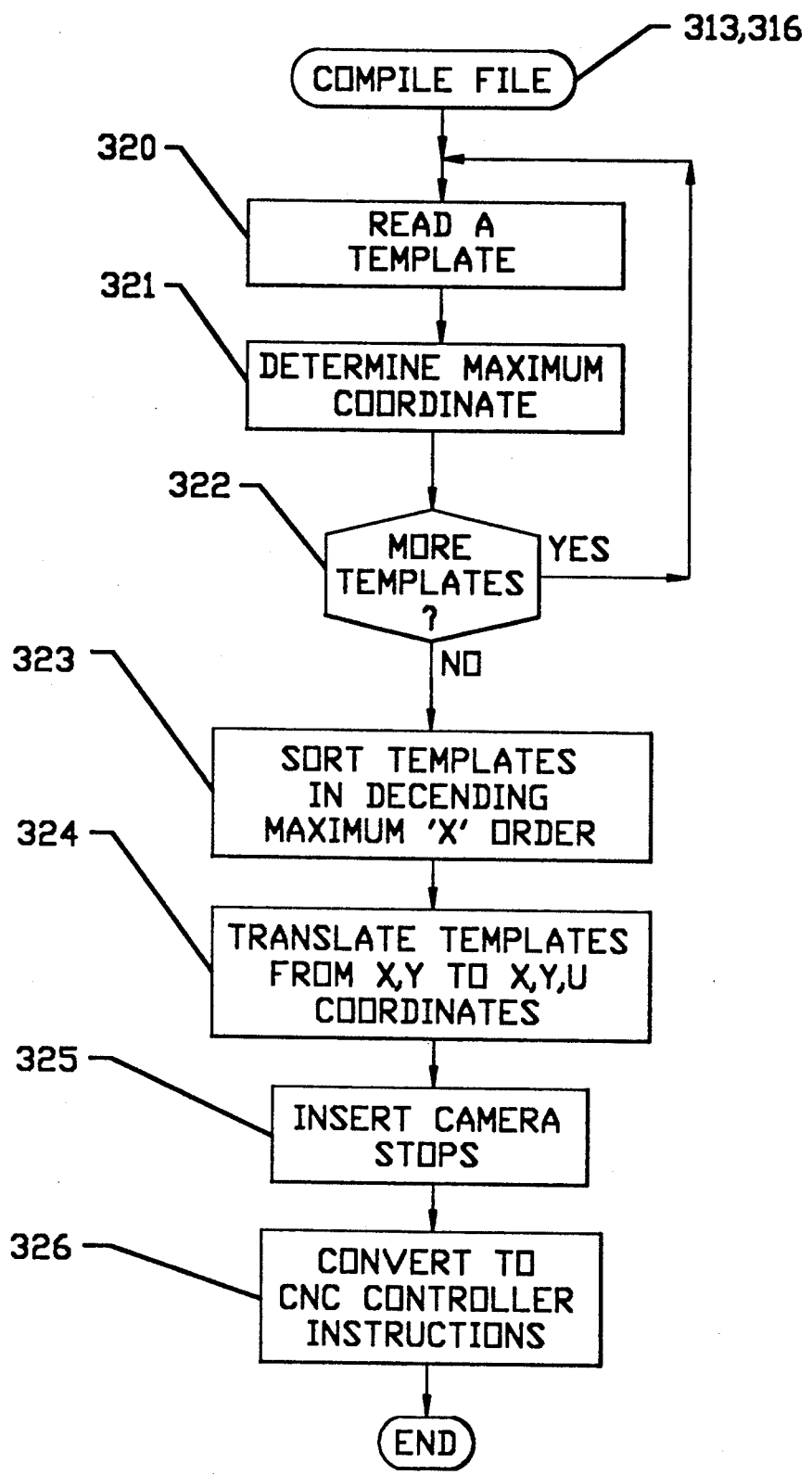

Referring again to FIG. 8B, a test is first made, at Block 310, as to whether any files are in the Cut Queue. If not, then at Block 317 processing returns to Block 301 of FIG. 8A. If yes, the next file is obtained at Block 311, and a test is made at Block 312 as to whether the next file has already been compiled. If not, then at Block 313 processing of FIG. 8C is performed to compile the file. If the block has already been compiled, then at Block 314 the controller is directed to cut the compiled file according to the compiled file instructions. Then, at Block 315, a test is made as to whether any uncompiled files still remain in the Cut Queue. If so, these remaining files are compiled at Block 316 so that the files are compiled before the controller actually needs them, in order to save time. If there are no uncompiled files, processing returns (at Block 317) to Block 301 of FIG. 8A.

Referring now to FIG. 8C, the processing to compile a file, as shown in Blocks 313 and 316 of FIG. 8B, will now be described. In order to compile a file, one template is first read from the cut file at Block 320. At Block 321 the maximum 'X' coordinate is determined where the 'X' coordinate was defined in the description of the overall system (FIG. 2). A test is then made at Block 322 as to whether there are more templates which have been released for cutting. If yes, this template is read at Block 320 and again the maximum 'X' coordinate is determined.

After the processing of Block 322 is completed, the templates are sorted into descending maximum ,U, order at Block 323. Then, at Block 324 the templates are translated from 'X,Y' to 'X,Y,U' coordinates according to the process already described. It will be recalled that the 'X,Y,U' coordinate system allows the conveyor to be moved continuously during the cutting process, to eliminate rapid starts and stops. At Block 325, camera stops are inserted if necessary to allow the camera to capture an image of the next section of fabric, should the conveyor stop, the laser is also turned off.

Then, at Block 326 the translated templates of Block 324 and the camera stops are converted to CNC controller instructions. It will be understood by those having skill in the art that the processing of Block 326 may take place in the Cut Queue task 39 in the CPU 15. Alternatively, it may take place in the CNC controller 42 itself.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A web cutting system comprising:
   image capture means, for capturing an image of a section of a web;
   operator input means for accepting operator commands; and
   electronic controlling means, connected to said image capture means and said operator input means, comprising:
   means for storing a first template pattern having a plurality of nested templates for the web;
   means cooperating with said storing means, for displaying at least part of the captured image of the web section, with corresponding ones of the plurality of nested templates superimposed thereon;
   means cooperating with said displaying means and said operator input means, for effecting movement of the displayed nested templates relative to one another and relative to the displayed image of the web section in response to operator commands to said operator input means, to individually align the displayed nested templates to the displayed image of the web section, and thereby produce a second template pattern for the displayed nested templates; and
   means cooperating with said movement effecting means, for converting the second template pattern into cutting instructions for the web section; and
   web cutting means, connected to said controlling means, for cutting said web section according to the cutting instructions; whereby the web is cut based upon the second template pattern, the templates of which are individually aligned to the web.

2. The system of claim 1 further comprising conveying means, connected to said controlling means, for conveying the web from said image capture means to said web cutting means, and wherein said controlling means further comprises:
   means for controlling said conveying means to convey said web section to said image capture means for capturing the image thereof, and to subsequently convey said web section to said web cutting means, for cutting the web section according to the cutting instructions.

3. The system of claim 2 wherein said image capture means comprises a video camera movably mounted above said conveying means at a first location thereon, and wherein said controlling means further comprises means for controlling said video camera for movement relative to said web section.

4. The system of claim 2 wherein said image capture means comprises a stationary video camera, mounted above said conveying means at a first location thereon, for capturing an image of said web section.

5. The system of claim 2 wherein said image capture means is mounted adjacent said conveying means at a first location; wherein said cutting means comprises a movable laser cutting means mounted adjacent said conveying means at a second location, spaced from the first location; and wherein said controlling means further comprises means for controlling said movable laser cutting means to cut said web section.

6. The system of claim 5 wherein said controlling means further comprises means for controlling said conveying means and said movable laser cutting means to cut said web section while said conveying means is moving.

7. The system of claim 1 further comprising transfer means, for conveying the web from said image capture means to said fabric cutting means.

8. The system of claim 7 wherein said transfer means comprises a transfer table.

9. The system of claim 1 wherein said image capture means comprises a movable video camera, and wherein said controlling means further comprises means for controlling said movable video camera for movement relative to said web section.

10. The system of claim 1 wherein said image capture means comprises a stationary video camera for capturing the image of said web section.

11. The system of claim 1 wherein said means for storing a first template pattern includes means for storing first template pattern for use with fabric.

12. The system of claim 1 wherein said means for storing a first template pattern includes means for storing first template pattern for use with patterned fabric.

13. The system of claim 1 wherein said means for storing a first template pattern includes means for storing first template pattern for use with patterned fabric to cover furniture.

14. The system of claim 1 wherein said means for storing a first template pattern includes means for storing first template pattern for use with leather.

15. The system of claim 1 wherein said means for storing a first template pattern includes means for storing first template pattern for use with patterned leather.

16. The system of claim 1 wherein said means for displaying comprises a high resolution color display.

17. The system of claim 1 wherein said means for displaying comprises a high resolution monochrome display.

18. The system of claim 1 wherein said operator input device comprises a pointing device.

19. The system of claim 1 wherein said means for storing a first template pattern includes means for storing first template pattern for use with perfect fabric.

20. The system of claim 1 wherein said web cutting means comprises a laser cutting means.

21. The system of claim 20 wherein said laser cutting means comprises a movable laser cutting means, and wherein said controlling means further comprises means for controlling said movable laser cutting means to cut said web section.

22. The system of claim 20 wherein said water jet cutting means comprises movable water jet cutting means, and wherein said controlling means further comprises means for controlling said movable water jet cutting means to cut said web section.

23. The system of claim 1 wherein said web cutting means comprises a water jet cutting means.

24. The system of claim 23 wherein said controlling means further comprises means for controlling said conveying means and said movable water jet cutting means to cut said web section according to the cutting instructions while said conveying means is moving.

25. The system of claim 1 further comprising means controlled by said controlling means, for placing identifying indicia directly upon the web section.

26. The system of claim 25 wherein said identifying indicia placing means comprises a label printer.

27. The system of claim 1 further comprising a chalker controlled by said controlling means, for placing chalk marks directly upon said web section.

28. The system of claim 1 wherein said means for effecting movement of the displayed nested templates comprises means for effecting translational movement of the displayed nested templates relative to the displayed image of the web section.

29. The system of claim 1 wherein said means for effecting movement of the displayed nested templates comprises means for effecting rotational movement of at least one of the displayed nested templates relative to the displayed image of the web section.

30. The system of claim 1 wherein said controlling means further comprises means for effecting warping of at least one of the displayed nested templates to align the at least one template to the displayed image of the web section.

31. The system of claim 1 wherein said controlling means further comprises means for magnifying the displayed image of the web section and the displayed nested templates superimposed thereon.

32. The system of claim 1 wherein said controlling means further comprises means for panning the displayed captured image of the web section and the displayed nested templates superimposed thereon.

33. The system of claim 1 wherein said image capture means further comprises means for digitizing the captured image of the web section.

34. The system of claim 33 wherein said digitizing means comprises a frame grabber.

35. The system of claim 33 wherein said controlling means further comprises means for storing the digitized captured image of the web section.

36. The system of claim 35 wherein said controlling means further comprises means for magnifying the stored digitized captured image and the stored plurality of nested templates.

37. The system of claim 35 wherein said controlling means further comprises means for panning the stored digitized captured image and the stored plurality of nested templates.

38. The system of claim 1 wherein said controlling means comprises a computer workstation.

39. The system of claim 1 wherein said means for effecting movement and said means for converting operate simultaneously.

40. The system of claim 1 wherein said displaying means comprises:
a display device;
means for displaying the captured image of the web section in a first section of the display device, with the nested templates superimposed thereon;
means for displaying a window in the first section of the display device, for enclosing at least some of the first section of the display device; and
means for displaying the image and templates enclosed by the window in a second section of the display device; and
wherein said means for effecting movement of the nested templates further comprises means for effecting movement of the window in said first section.

41. The system of claim 40 wherein said means for displaying the captured image and nested templates enclosed by the window comprises means for displaying the captured image and corresponding templates at a predetermined magnification.

42. The system of claim 1 wherein said controlling means further comprises:
means for indicating that at least one of the nested templates are aligned to the displayed image of the web section, and may be cut by said web cutting means.

43. The system of claim 42 wherein said indicating means comprises:
a bar on said displaying means, spanning across the at least part of the captured image of the web section and the nested templates superimposed thereon; and
means for effecting movement of said bar, to indicate that the at least part of the captured image of the web section and the nested templates superimposed thereon are aligned.

44. The system of claim 1 wherein said means for storing a first template pattern comprises:
means for storing therein a library of template patterns including said first template pattern; and
means for selecting said first template pattern from said library of template patterns.

45. A web cutting system comprising:
image capture means, for capturing an image of a section of a web;
electronic controlling means, connected to said image capture means, comprising:
means for storing a first template pattern having a plurality of nested templates for the web;
means cooperating with said storing means, for displaying at least part of the captured image of the web section, with corresponding ones of the plurality of nested templates superimposed thereon;
means cooperating with said displaying means, for effecting movement of the displayed nested templates relative to the displayed image of the web section, to align the displayed nested templates to the displayed image of the web section, and thereby produce a second template pattern for the displayed nested templates; and
means cooperating with said movement effecting means, for converting the second template pattern into cutting instructions for the web section; and
web cutting means, connected to said controlling means, for cutting said web section according to the cutting instructions;
wherein said controlling means comprises a computer workstation operatively connected to a computer numerical controller.

46. A web cutting system comprising:
image capture means, for capturing an image of a second of a web;
electronic controlling means, connected to said image capture means, comprising:

means for storing a first template pattern having a plurality of nested templates for the web;

means cooperating with said storing means, for displaying at least part of the captured image of the web section, with corresponding ones of the plurality of nested templates superimposed thereon;

means cooperating with said displaying means for effecting movement of the displayed nested templates relative to the displayed image of the web section, to align the displayed nested templates to the displayed image of the web section, and thereby product a second template pattern for the displayed nested templates; and means cooperating with said movement effecting means, for converting the second template pattern into cutting instructions for the web section;

web cutting means, connected to said controlling means, for cutting said web section according to the cutting instructions;

conveying means, connected to said controlling means, for conveying the web from said image capture means to said web cutting means, said conveying means comprising a flat wire conveyor; and wherein said controlling means further comprises:

means for controlling said conveying means to convey said web section to said image capture means for capturing the image thereof, and to subsequently convey said web section to said web cutting means, for cutting the web section according to the cutting instructions.

47. The system of claim 46 wherein said flat wire conveyor comprises a plurality of nested serpentine wires, vertically mounted face to face relative to one another.

48. A cutting system comprising:
a conveyor including a plurality of flat-faced, serpentine, nested wires, spaced apart from one another, with the flat faces thereof facing one another; and a plurality of rods, each of which passes through at least a pair of adjacent ones of said flat-faced, serpentine nested wires for maintaining said flat-faced serpentine wires spaced apart from one another; and a laser beam for cutting an article carried on said conveyor, the faces of said flat-faced serpentine wires being oriented parallel to said laser beam;

whereby minimal area of said conveyor is exposed to said laser beam.

49. A cutting system comprising:
a conveyor including a plurality of flat-faced, serpentine, nested wires, spaced apart from one another, with the flat faces thereof facing one another; and a plurality of rods, each of which passes through at least a pair of adjacent ones of said flat-faced, serpentine, nested wires for maintaining said flat-faced serpentine wires spaced apart from one another; and a water jet for cutting an article carried on said conveyor, the faces of said flat-faced serpentine wires being oriented parallel to said water jet;

whereby minimal area of said conveyor is exposed to said water jet.

50. A web cutting system comprising:
movable laser beam cutting means;
means for conveying the web past said movable laser beam cutting means; and means for controlling said movable laser beam cutting means and said conveying means to cut the web by simultaneously moving said conveying means and said movable laser beam cutting means;

wherein said conveying means comprises a plurality of flat-faced, serpentine nested wires, spaced apart from one another, with the flat faces thereof facing one another; and means for maintaining said flat-faced serpentine wires spaced apart from one another; and wherein the laser beam is oriented parallel to said flat faced serpentine wires, whereby minimal area of said conveying means is exposed to said laser beam.

51. A web cutting system comprising:
movable water jet cutting means;
means for conveying the web past said movable water jet cutting means; and means for controlling said movable water jet cutting means and said conveying means to cut the web by simultaneously moving said conveying means and said movable water jet cutting means;

wherein said conveying means comprises a plurality of flat-faced, serpentine, nested wires, spaced apart from one another, with the flat faces thereof facing one another; and means for maintaining said flat-faced serpentine wires spaced apart from one another; and wherein the water jet is oriented parallel to said flat faced serpentine wires, whereby minimal area of said conveying means is exposed to said water jet.

52. A web cutting method, comprising the following steps:
capturing an image of a first section of a web;
aligning a displayed plurality of nested templates relative to a displayed previously captured image of a second section of the web, to generate customized cutting instructions for the second section of the web; and cutting a third section of the web in accordance with previously generated customized cutting instructions for the third section of the web; wherein said capturing, aligning and cutting steps are performed simultaneously;

whereby each section of the web is cut at high speed using customized cutting instructions which are generated for each specific section of the web.

53. The method of claim 52 wherein said aligning step comprises the step of individually aligning the displayed plurality of nested templates to the displayed previously captured image of the second section of the web.

54. The method of claim 52 wherein said capturing step comprises the step of capturing the image of the first section of the web using a movable video camera.

55. The method of claim 52 wherein said capturing step comprises the steps of:
capturing the image of the first section of the web using a video camera;
digitizing the captured image; and
storing the digitized captured image in a memory device.

56. The method of claim 52 wherein the web comprises fabric.

57. The method of claim 56 wherein the fabric comprises patterned fabric.

58. The method of claim 52 wherein the web comprises leather.

59. The method of claim 52 wherein said aligning step is performed on a high resolution video display.

60. The method of claim 52 wherein said aligning step comprises the step of aligning the displayed plurality of nested templates relative to a displayed previously captured image of a second section of the web in response to an operator input.

61. The method of claim 52 wherein the displayed plurality of nested templates comprise nested templates for a flawless web.

62. The method of claim 52 wherein said cutting step comprises the step of cutting the third section of the web with a laser beam.

63. The method of claim 52 wherein said cutting step comprises the step of cutting the third section of the web with a movable laser beam while the third section is moving.

64. The method of claim 52 wherein said cutting step comprises the step of cutting the third section of the web with a movable water jet while the third section is moving.

65. The method of claim 52 further comprising the step of placing identifying indicia directly upon the third web section.

66. The method of claim 65 wherein said identifying indicia placing step comprises the step of placing a label directly upon the third web section.

67. The method of claim 52 further comprising the step of placing chalk marks directly upon the third web section.

68. The method of claim 52 wherein said aligning step comprises the step of translating the displayed plurality of nested templates relative to the displayed previously captured image of the second section of the web.

69. The method of claim 52 wherein said aligning step comprises the step of rotating at least one of the displayed plurality of nested templates relative to the displayed previously captured image of the second section of the web.

70. The method of claim 52 wherein said aligning step comprises the step of warping at least one of the displayed plurality of nested templates relative to the displayed previously captured image of the second section of the web.

71. The method of claim 52 wherein said aligning step comprises the steps of:
 displaying in a first section of a display device, the previously captured image of the second web section with the plurality of nested templates superimposed thereon;
 displaying a window in the first section of the display device, for enclosing at least some of the first section of the display device; and
 displaying the previously captured image and templates enclosed by the window in a second section of the display device.

72. The method of claim 71 wherein the last displaying step comprises the step of displaying the previously captured image and corresponding templates enclosed by the window at a predetermined magnification.

73. The method of claim 52 further comprising the step of indicating that at least one of the plurality of nested templates are aligned to the previously captured image of the second web section, and may be cut during said cutting step.

74. The method of claim 73 wherein said indicating step comprises:
 displaying a bar across the displayed previously captured image of the second web section and the displayed plurality of nested templates; and
 moving said bar, in response to an operator command, to indicate that the at least one of the plurality of nested templates is aligned to the displayed part of the previously captured image of the web section.

75. A patterned fabric cutting system comprising:
 a fabric conveyor for conveying patterned fabric along a first direction;
 a video camera mounted adjacent said fabric conveyor at a first location thereon, for capturing an image of the patterned fabric at said first location;
 a frame grabber, connected to said video camera for digitizing the captured image of the patterned fabric at the first location;
 a memory device, connected to said frame grabber, for storing therein the digitized captured image of the fabric at the first location;
 a data storage device, for storing therein a first template pattern for the patterned fabric;
 an operator display;
 a cutting station mounted adjacent said fabric conveyor at a second location thereon, spaced from said first location along said first direction, for cutting the patterned fabric at the second location; and
 a computer, operatively connected to said memory device, said data storage device and said operator display, said computer comprising:
  a nesting module, for obtaining from memory device a stored, digitized, captured image of a first section of the patterned fabric and for displaying the obtained image on said operator display; for obtaining at least part of the first template pattern from said data storage device and for displaying the obtained first template pattern on said operator display, superimposed on the displayed obtained image; said nesting module being responsive to operator commands for aligning the first template pattern to the fabric pattern in the displayed obtained image to produce a customized template pattern for the first section of the patterned fabric; and
  a cut queue module cooperating with said nesting module, for converting the customized template pattern into customized cutting instructions for the first section of the patterned fabric;
 a computer numerical controller operatively connected to said computer, said fabric conveyor and said cutting station, for controlling said conveyor to move said first section of the patterned fabric in said first direction to the second location; and for controlling the cutting station to cut the first section of fabric in accordance with the customized cutting instructions for the first section of fabric;
 whereby the patterned fabric is cut based upon customized cutting instructions therefor.

76. The patterned fabric cutting system of claim 75 wherein said nesting module is responsive to operator commands for individually aligning at least one template in the first template pattern to the fabric pattern in the displayed obtained image.

77. The system of claim 75 wherein said video camera comprises a movable video camera, and wherein said nesting module further comprises means for controlling said movable video camera for movement relative to said first section of the patterned fabric.

78. The system of claim 75 wherein said video camera comprises a stationary video camera, and wherein said computer numerical controller further comprises means for controlling said conveyor to move said first section of the patterned fabric past said stationary video camera.

79. The system of claim 75 wherein said data storage device stores therein a first template pattern including a complete set of templates for patterned fabric to cover furniture.

80. The system of claim 75 wherein said operator display comprises a high resolution color display.

81. The system of claim 75 wherein said operator display comprises a high resolution monochrome display.

82. The system of claim 75 further comprising a pointing device, wherein the operator commands are provided to the nesting module by the pointing device.

83. The system of claim 75 wherein said data storage device stores therein a first template pattern for a flawless patterned fabric.

84. The system of claim 75 wherein said cutting station comprises a laser cutting station.

85. The system of claim 84 wherein said laser cutting station comprises a movable laser cutter; and wherein said computer numerical controller further comprises means for controlling said movable laser cutter to cut said first section according to the customized cutting instructions produced by said cut queue module.

86. The system of claim 85 wherein said computer numerical controller further comprises means for controlling said fabric conveyor and said movable laser cutter to cut said first fabric section according to the cutting instructions while said fabric conveyor means is moving.

87. The system of claim 75 wherein said cutting station comprises a water jet cutting station.

88. The system of claim 87 wherein said water jet cutting station comprises a movable water jet cutter; and wherein said computer numerical controller further comprises means for controlling said movable water jet cutter to cut said first section according to the customized cutting instructions produced by said cut queue module.

89. The system of claim 88 wherein said computer numerical controller further comprises means for controlling said fabric conveyor and said movable water jet cutter to cut said first fabric section according to the cutting instructions while said fabric conveyor means is moving.

90. The system of claim 75 further comprising means, operatively connected to said computer numerical controller, for placing identifying indicia directly upon the first fabric section.

91. The system of claim 90 wherein said identifying indicia placing means comprises a label printer.

92. The system of claim 75 further comprising a chalker, operatively connected to said computer numerical controller, for placing chalk marks directly upon said first fabric section.

93. The system of claim 75 wherein the nesting module is responsive to operator commands for translating the first template pattern relative to the displayed obtained image.

94. The system of claim 75 wherein the nesting module is responsive to operator commands for rotating at least one template in the first template pattern relative to the displayed obtained image.

95. The system of claim 75 wherein the nesting module is responsive to operator commands for warping at least one template in the first template pattern relative to the displayed obtained image.

96. The system of claim 75 wherein said fabric conveyor comprises a flat wire conveyor.

97. The system of claim 96 wherein said flat wire conveyor comprises a plurality of nested serpentine wires, vertically mounted face to face relative to one another.

98. The system of claim 75 wherein said nesting module further comprises means for magnifying the first template pattern and the displayed obtained image.

99. The system of claim 75 wherein said nesting module further comprises means for panning the first template pattern and the displayed obtained image.

100. The system of claim 75 wherein said computer comprises a microprocessor-based workstation.

101. The system of claim 75 wherein said nesting module and said cut queue module operate simultaneously.

102. The system of claim 75 wherein said nesting module further comprises:
means for displaying the captured image of the web section in a first section of the operator display, with the nested templates superimposed thereon;
means for displaying a window in the first section of the operator display, for enclosing at least some of the first section of the operator display; and
means for displaying the image and templates enclosed by the window in a second section of the display device.

103. The system of claim 102 wherein said means for displaying the image and templates enclosed by the window comprises means for displaying the image and templates at a predetermined magnification.

104. The system of claim 102 wherein said nesting module further comprises:
means for indicating that at least one of the nested templates is aligned to the displayed image of the web section, and may be cut by said cutting station.

105. The system of claim 104 wherein said indicating means comprises:
a bar on said operator display, spanning across the image and the templates; and
means for effecting movement of said bar, to indicate that the at least one of the templates is aligned.

106. The system of claim 75 wherein said data storage device stores therein a library of template patterns including said first template pattern; and wherein the nesting module further comprises means for selecting said first template pattern from said library of template patterns.

* * * * *

UNITED STATES PATENT AND TRADEMARK OFFICE
CERTIFICATE OF CORRECTION

PATENT NO. : 5,172,326
DATED : December 15, 1992
INVENTOR(S) : Campbell, Jr. et al.

It is certified that error appears in the above-identified patent and that said Letters Patent is hereby corrected as shown below:

On the Title page, item [54]
In the title, "OPERATION" should be --OPERATOR--.

Column 1, line 2 "OPERATION" should be --OPERATOR--.

Column 6, line 40, "7u" should be --7v--.

Column 6, line 42, "8e" should be --8c--.

Column 9, line 44, "Ill" should be --IL--.

Column 9, line 57, "Ill." should be --IL--.

Column 12, line 10, "42)" should be --42")--.

Column 28, line 66, "second" should be --section--.

Column 29, line 13, "product" should be --produce--.

Signed and Sealed this

Eleventh Day of January, 1994

Attest:

BRUCE LEHMAN

Attesting Officer     Commissioner of Patents and Trademarks